(12) United States Patent
Horley et al.

(10) Patent No.: US 8,407,529 B2
(45) Date of Patent: Mar. 26, 2013

(54) TRACE SYNCHRONIZATION

(75) Inventors: John Michael Horley, Hauxton (GB); Andrew Brookfield Swaine, Cambridge (GB); Thomas Sean Houlihane, Bassingbourn (GB); Sheldon James Woodhouse, Caythorpe (GB); Michael John Williams, Wicken (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 13/339,937

(22) Filed: Dec. 29, 2011

(65) Prior Publication Data

US 2012/0110387 A1    May 3, 2012

Related U.S. Application Data

(63) Continuation of application No. 12/385,319, filed on Apr. 3, 2009, now Pat. No. 8,176,366.

(51) Int. Cl.
*G06F 11/00* (2006.01)
(52) U.S. Cl. .......................................... 714/45; 712/227
(58) Field of Classification Search .................. 714/45; 712/227; 717/128
See application file for complete search history.

(56) References Cited

U.S. PATENT DOCUMENTS

| | | | |
|---|---|---|---|
| 7,219,333 B2 | 5/2007 | Agarwala et al. | |
| 8,055,950 B2 | 11/2011 | Houlihane et al. | |
| 2002/0161989 A1 | 10/2002 | Swaine | |
| 2003/0154028 A1 | 8/2003 | Swaine et al. | |
| 2003/0229823 A1 | 12/2003 | Swaine et al. | |
| 2004/0024995 A1 | 2/2004 | Swaine | |
| 2004/0117607 A1 | 6/2004 | Swoboda | |
| 2004/0153813 A1 | 8/2004 | Swoboda | |
| 2004/0158776 A1 | 8/2004 | McCullough et al. | |
| 2005/0033553 A1 | 2/2005 | Swaine | |
| 2005/0039078 A1 | 2/2005 | Bradley et al. | |
| 2005/0268177 A1 | 12/2005 | John | |
| 2006/0005083 A1 | 1/2006 | Genden et al. | |
| 2006/0184835 A1 | 8/2006 | Al-Omari et al. | |
| 2007/0067508 A1 | 3/2007 | Chai et al. | |
| 2008/0155353 A1 | 6/2008 | Craske | |
| 2008/0288741 A1 | 11/2008 | Lee et al. | |
| 2009/0150728 A1 | 6/2009 | Barlow et al. | |
| 2009/0183034 A1 | 7/2009 | Houlihane et al. | |

OTHER PUBLICATIONS

Office Action mailed Feb. 7, 2011 in co-pending U.S. Appl. No. 12/007,580.
Office Action mailed Jul. 20, 2010 in co-pending U.S. Appl. No. 12/007,580.
U.S. Appl. No. 12/007,580, filed Jan. 11, 2008, Houlihane et al.
Office Action mailed Apr. 1, 2010 in co-pending U.S. Appl. No. 12/007,580.

*Primary Examiner* — Scott Baderman
*Assistant Examiner* — Joseph Kudirka
(74) *Attorney, Agent, or Firm* — Nixon & Vanderhye P.C.

(57) ABSTRACT

A data processing apparatus having one or more trace data sources. At least one of said trace data sources includes a trace data generator responsive to activity in monitored circuitry to generate trace data representing said activity. A synchronization marker generator is coupled to the trace data generator and operates to generate a synchronization marker and insert the synchronization marker into the trace data stream. A controller is coupled to the synchronization marker generator to generate and insert a synchronization marker into the trace data stream. The controller controls initiation in dependence on behavior of the data processing apparatus downstream of the trace data generator. In this way, the downstream behavior of the data processing apparatus can be made to influence the rate and timing of insertion of synchronization markers into a trace data stream.

12 Claims, 14 Drawing Sheets

TRACE SYNCHRONIZATION

This application is a Continuation of application Ser. No. 12/385,319, filed Apr. 3, 2009, now U.S. Pat. No. 8,176,366 the entire content of which is incorporated herein by reference.

BACKGROUND OF THE INVENTION

1. Field of the Invention

This invention relates to trace synchronization. More particularly, this invention relates to a data processing apparatus and a data processing method which control the insertion of synchronization markers into a trace data stream to enable the synchronization of the trace data.

2. Description of the Prior Art

In a data processing apparatus, there are two main methods of facilitating debugging. The first method is to use debugging techniques such as setting breakpoints to halt code execution at a specific activity and to use a debug connection between the data processing apparatus and an external debugging apparatus to examine the status of the data processing apparatus at the breakpoint. The second method is to use trace monitoring to collect from the data processing apparatus, in real time, data representing instruction execution and/or data transfers, and to deliver the data to a trace analysis apparatus. One architecture which provides for this type of trace monitoring is the ARM Embedded Trace Macrocell architecture.

Data collected from a data processing apparatus for trace monitoring purposes is referred to as trace data. The trace data may be generated by trace data sources within the data processing apparatus which receive data signals from respective elements of the data processing apparatus which are associated with the trace data sources. Examples of such elements include a central processing unit, a coprocessor and a DMA (Direct Memory Access) controller. The trace data may then be temporarily stored in a trace buffer before being delivered externally of the data processing apparatus via a trace port.

Trace data is typically compressed to reduce the amount of trace data which needs to be stored and transferred. In order to analyze a stream of trace data in this case, the position of individual data frames may need to be determined, and the decompression routines initialized. To enable these processes to be achieved, various special synchronization packets may be inserted into the trace data. The nature of the compression, and the nature of the circuit which is being traced may mean that the rate at which trace data is generated varies considerably over time.

It may frequently be the case that more trace data will be generated than is captured for later processing. Synchronization data should therefore preferably be inserted with sufficient frequency to allow that data which is captured to be processed. The synchronization process may itself be capable of generating a large amount of trace data in a short time.

Where multiple trace data sources are used to generate trace data corresponding to multiple respective elements of the data processing apparatus, the amount of trace data generated at a particular time may become large. In this case, the insertion of synchronization information into the trace data stream may result in data loss conditions within the trace monitoring circuitry of the data processing apparatus.

SUMMARY OF THE INVENTION

Viewed from one aspect the present invention provides a data processing apparatus having one or more trace data sources, said trace data sources operating to generate respective streams of trace data, at least one of said trace data sources comprising:

a trace data generator responsive to activity in monitored circuitry to generate trace data representing said activity;

a synchronization marker generator coupled to said trace data generator, said synchronization marker generator operating to generate a synchronization marker and insert said synchronization marker into said trace data stream, said synchronization marker identifying a synchronization position in said trace data stream; and a controller coupled to said synchronization marker generator, said controller operating to initiate said synchronization marker generator to generate and insert said synchronization marker into said trace data stream; wherein said controller controls initiation in dependence on behavior of said data processing apparatus downstream of said trace data generator with respect to trace data flow.

In this way, the downstream behavior of the data processing apparatus can be used to influence the rate and timing of insertion of synchronization markers into a trace data stream, thereby reducing the likelihood of the volume of trace data, which is increased by the insertion of synchronization markers, causing an overflow condition in the downstream circuitry. For instance, the controller may monitor an amount of trace data accepted by downstream circuitry of the data processing apparatus to determine the downstream behavior. Where the amount of trace data accepted by the downstream circuitry is relatively small, this may be taken as indicative that the downstream circuitry is heavily loaded, possibly with trace data generated by another trace data source. In this case, it would not be appropriate to insert a synchronization marker into the trace data, because the resulting increase in the amount of trace data would increase the loading on the downstream circuitry and may result in an overload condition. Where the amount of trace data accepted by the downstream circuitry is relatively large, this may be taken as indicative that the downstream circuitry is not overloaded. In this case, it may be assumed that a synchronization marker may safely be inserted into the trace data without significant risk of overloading the downstream circuitry.

Alternatively, the trace data sources may each include a local buffer coupled to the trace data generator and downstream thereof to receive and store the trace data generated by the trace data generator. The local buffer may be coupled to the synchronization marker generator and downstream thereof to receive and store synchronization markers generated by the synchronization marker generator, or alternatively the synchronization markers may be inserted downstream of the local buffer. A local buffer is particularly useful where trace data is likely to be generated at a relatively low average data rate, but in bursts. Accordingly, where a local buffer is provided, the controller controls initiation of the generation and insertion of a synchronization marker into the trace data stream in dependence on a current utilization or a current free capacity of the local buffer. Accordingly, the insertion of synchronization markers into the trace data stream via the local buffer may be inhibited while the current utilization of the local buffer is high and/or until sufficient free space is available in the local buffer. This will reduce the problem of overflowing the local buffers, and may reduce the likelihood of overloading circuitry downstream of the local buffer, because the current utilization of the local buffer, and the current free capacity of the local buffer will be related to the rate of take up of trace data from the local buffer by the downstream circuitry. Moreover, if the threshold for synchronization insertion is set fairly low, the rate of insertion becomes more sensitive to the state of the downstream circuitry.

The generation and insertion of synchronization markers may be initiated in dependence on a synchronization request. Synchronization requests may arise in several different ways. In particular, the trace data source may comprise a counter, and the counter may operate to generate the synchronization requests at periodic intervals. In this way, regular synchronization of the trace data stream can be provided. The periodic intervals may correspond to either a predetermined duration or a predetermined amount of generated trace data. Another example is that synchronization requests may be invoked by an external device or element of the data processing apparatus.

The data processing apparatus may also include a trace buffer which operates to store trace data generated by the plurality of trace data sources. The stored trace data can then be extracted from the trace buffer out of real-time for analysis. The data processing apparatus may also include a trace buffer state monitor which monitors a volume of trace data being stored into the trace buffer. The trace buffer state monitor then generates a synchronization request each time a predetermined volume of trace data has been stored into the trace buffer. In this way, synchronization markers can be distributed throughout the trace data stored within the trace buffer at a desired separation.

The trace buffer which captures the trace data is usually a circular buffer, which means that initial start-up trace data may not necessarily be present in the captured trace since it may have been overwritten. Also, where the trace buffer is large, trace tools might capture a large amount of data but it may not be desirable to analyze all of the trace. In this case, analysis may be started at random or predetermined points in the trace buffer.

Generally, synchronization markers will be generated and inserted into the trace data stream in response to synchronization requests only when specific criteria associated with the downstream behavior of the data processing apparatus are satisfied. However, the controller may control initiation of the synchronization marker generator when a synchronization request has remained unsatisfied for a predetermined duration. In this way, it is possible to ensure that trace data is not left unsynchronized for too long, even if the insertion of a synchronization marker may risk overflowing internal buffers or overloading the downstream circuitry.

Synchronization markers may take several forms. For instance, the synchronization marker may comprise a predetermined code and/or a data packet. In the case of a predetermined code, the code may be a particular pattern of bits which are inserted into the trace data stream to identify the type of data which follows the code. The trace data generated by each trace data generator may be compressed trace data. In this case, each synchronization marker may provide an initialization point for decompression of the compressed trace data. Where the trace data is compressed, since compression techniques are used to efficiently pack the trace information, synchronization points are inserted into the trace stream. The synchronization points in this case may be points at which data is output in its full, rather than compressed, form to enable decompression to start from that point.

The trace data stream may be represented by several different aspects, for instance alignment, instructions, data and timestamps. Accordingly, the synchronization marker generator may generate and insert a plurality of different synchronization markers corresponding to respective different aspects of the trace data stream into the trace data stream.

Further, the controller may optionally control initiation of the synchronization marker generator to generate and insert one or more of the plurality of different synchronization markers in accordance with a predetermined priority associated with each of the different synchronization markers. The different synchronization markers may include an alignment synchronization marker for identifying a packet boundary alignment of said trace data stream, an instruction synchronization marker for identifying a memory address of an instruction within said trace data stream, a data synchronization marker for identifying a memory address of a unit of data within said trace data stream, and a time stamp synchronization marker for identifying a time stamp position within said trace data stream.

Each aspect of the trace data stream should preferably be synchronized to permit full use to be made of the trace data. To enable efficient use of a trace buffer, it would be sensible to synchronize all of these at the same time. However, synchronization usually requires a large amount of additional data to be generated, which could result in internal buffers overflowing, or a corresponding increase in the size of the internal buffers used. The problems associated with synchronization are multiplied in larger systems with multiple processors and multiple sources of trace data.

It is desirable to reduce the occurrence of the overflowing condition while keeping synchronization points close together. It is also desirable to reduce the requirement for a complex synchronization request distribution scheme, which would become increasingly harder to implement in a large system made up of sub-system elements. Previously, synchronization points have been alternated within the trace data at a fixed synchronization frequency. This has the disadvantage that instruction synchronization might be attained, but data synchronization is not achieved for a much greater period of time, resulting in wasted trace, or trace where data addressed could not be properly decoded. These problems and disadvantages are addressed by embodiments of the present invention by synchronizing, in response to a synchronization request, at a first opportunity in dependence on the loading conditions on downstream circuitry. This can have an effect of moving the synchronization of instructions and data closer together.

In systems with multiple trace sources, if all devices synchronize at the same time, they might all attempt to push trace data onto a trace bus at the same time, causing a bottleneck in the trace capture system. Embodiments of the present invention seek to smooth the generation of trace data, adapting to the requirements of the capture system. Previously, there had been no correlation between the synchronization of separate trace sources, and schemes to stagger the insertion of synchronization positions had been considered. A system which staggered the different synchronization from different sources would have resulted in a guaranteed amount of trace data which would need to be discarded before all sources where synchronized. Embodiments of the present invention seek to reduce the need to implement a mechanism for staggering synchronization between sources, and to enable all sources to be synchronized at near to the same time (within the constraints of available bandwidth).

Some trace protocols require data synchronization to be performed on the first data transfer after instruction synchronization. This has the potential to overflow internal buffers by requiring uncompressed data to be output at specific times in the protocol. Other trace protocols do not place any requirements on the relationship between the various forms of synchronization, thereby potentially wasting trace data because the different synchronization points are too far apart in the trace.

The insertion of data and instruction synchronization can be delayed if the trace generation logic is in the process of inserting other trace packets. With embodiments of the present invention, a trace source can delay the insertion of synchronization markers until sufficient bandwidth is available. In this way, the system does not need to be aware of synchronization points in detail. This makes it possible to make better use of the available buffers in each trace source, and may avoid having to increase the size of those buffers purely to support periodic synchronization, which would be more area and power inefficient. This is especially important when considering multiple trace sources, since each source would need a larger FIFO.

The data processing apparatus may also comprise funnel circuitry arranged to receive trace data streams from two or more trace data sources. The funnel circuitry will in this case operate to combine trace data streams output by the two or more trace data sources to form a combined trace data stream. This is achieved by selecting between the two or more trace data sources to form the combined trace data stream in accordance with predetermined rules. The trace data sources may have respective priority values associated with them, and the predetermined rules will in this case determine how to arbitrate between the trace data sources to give preference to higher priority sources without causing trace data from one or more of the trace data sources to be ignored.

The plurality of trace data sources may be used to monitor the operation of a wide variety of elements of the data processing apparatus. For instance, the monitored circuitry may comprise a processor, a bus or a memory controller.

The data processing apparatus may comprise one or more trace handling circuits arranged to handle trace data generated by said trace data generator of said at least one trace data source. The trace handling circuits handle the generated trace data, for example, so that it can be analyzed by a tracing tool. It can be desirable that the initiation of synchronization is controlled by the trace handling circuits. This is because the trace handling circuits can be aware of downstream trace data requirements that the trace data sources do not have access to, such as the volume of trace data currently being handled by the trace handling circuits. Therefore, in embodiments the one or more trace handling circuits each have requesting circuitry for issuing a synchronization request, and the controller of at least one trace data source is responsive to receipt of the synchronization request to initiate the synchronization marker generator to generate and insert the synchronization marker into the trace data stream. In this way, the trace handling circuits can arrange for synchronization to occur at an appropriate time so that the downstream trace handling circuits are not overloaded. Note that a trace handling circuit may also be referred to as a trace sink, since it is through the trace handling circuits that trace data will eventually be removed from the system.

At least one of the one or more trace handling circuits may be an on-chip trace buffer. Such buffers can be used to store trace data on-chip so that it can later be analyzed by a trace analyzer. In this case, the requesting circuitry associated with the on-chip trace buffer could control synchronization by trace data sources in dependence upon the amount of trace data currently stored in the buffer. The frequency with which the requesting circuitry of the trace buffer requests synchronization could also be dependent upon the size of the buffer. Since typically only a single synchronization point is required in a buffer of trace data, the requesting circuitry could issue its synchronization request at an appropriate frequency so that synchronization markers are not inserted into the trace data stream unnecessarily often. This helps to ensure more efficient use of the on-chip trace buffer. Depending on the format of the trace data, it might be preferable that the synchronization point occurs near the start of the trace buffer, in case all trace prior to the synchronization point needs to be discarded.

At least one of the one or more trace handling circuits may be an output port for transferring trace data to an off-chip capture device. The off-chip capture device could be a trace buffer or a trace analyzing device. The requesting circuitry associated with the output port can trigger synchronization based on the amount of trace data currently being output over the output port. For example, if it detects that there is a period where the trace port is underused, it could request synchronization at this time, as at this point there is a lower probability of causing an overflow. Additionally, it may be programmed with a period based on the size of an off-chip trace buffer.

It is possible that at least one trace handling circuit handles trace data from a plurality of trace data sources. The respective trace data sources may not generate trace data at the same rate. In this case, it is possible that if each trace source is synchronized individually, the trace handling circuit may not capture enough synchronization points to be able to process the trace data streams generated by each data source. For example, in a two source system, a first source could generate trace data at a rate of one byte per cycle, while a second source generates trace data at one bit per cycle. The two generator streams could be combined and output over a single trace port. If both sources are configured to synchronize every 1000 bytes (of their own trace), then the first source will synchronize every 1000 cycles and the second source every 8000 cycles. If a trace capture buffer for capturing the generated trace streams has a capacity of only 4000 bytes, then this 4000 bytes will contain about 3500 bytes from the first source and 500 bytes from the second source. Since the 500 bytes captured from the second trace stream is smaller than the interval between successive synchronizations by the second trace data source, it is possible that the captured trace stream from the second source will have no synchronization points and so will not be usable. Although it is possible to avoid this problem by reducing the synchronization period of the second trace source, this would require the trace generation rates of each source to be known in advance. This is not always easy, since trace data rates may be highly variable, for example, when trace data is filtered prior to being output by the data sources.

This problem can be addressed by arranging for the requesting circuitry of at least one trace handling circuit to issue a global synchronization request to a plurality of trace sources. For each of the trace data sources, the controller initiates the synchronization marker generator in response to receipt of the global synchronization request. Global trace synchronization means that all trace data sources would be synchronized together. In the example explained above, synchronization of both trace streams could be requested every 1000 bytes of data captured by the trace handling circuit. This should ensure that for a 4000 byte buffer there will be four synchronization points in each of the captured trace streams. Since synchronization is controlled globally by the trace handling circuits (not by individual trace data sources), there is no risk of accidentally losing trace data because synchronization data did not get captured. Also, there is no need to try to predict trace bandwidth requirements of multiple sources in advance.

It will be appreciated that different methods could be used to distribute the global synchronization requests to the plurality of trace data sources. However, when the at least one trace handling circuit receives trace data from the plurality of trace data sources via respective trace data paths, it is particularly useful for the requesting circuitry of the at least one trace handling circuit to issue the global synchronization request to the plurality of trace data sources via those same trace data paths. The trace data paths could be part of a trace bus infrastructure. Since the trace data paths will already have been configured at run-time to transmit the trace data from the trace data source to the trace handling circuits, reusing those trace data paths to issue the global synchronization request means that global synchronization can be implemented with little additional hardware cost.

Not all available trace data paths need to be used at any one time, depending on the trace analysis being performed. The apparatus may comprise control circuitry for selecting the trace data paths from a plurality of available trace data paths. The control circuitry could configure the selected trace data paths at run-time depending on the trace operation to be performed, so that these paths can transmit trace data to the trace handlers. The same trace data paths will then need no additional configuration in order to transfer the synchronization requests back from the requesting circuitry of the trace handling circuits to the trace data sources. The reuse of the already configured trace data paths for conveying the global synchronization request to the trace data sources has a particular advantage if a trace handling circuit captures trace streams from only a subset of trace data sources. This is because it can be ensured that the global synchronization request issued from a trace handling circuit is used to target only sources which supply trace data to that handling circuit. Since trace data sources that do not supply the handling circuit with trace data will not have had a corresponding trace data path configured by the control circuitry, such trace data sources will not receive the synchronization request from the handling circuit, and so will not insert unnecessary synchronization markers into their trace data streams (which may be being captured by other trace handling circuits).

At least one trace handling circuit may be responsive to a trigger signal to stop capturing trace data. Triggering is typically used to indicate to a trace handling circuit that trace capture should be stopped, so that a particular batch of trace data can be analyzed. Since only a single synchronization point per trace stream is typically required in a buffer of trace data, the requesting circuitry can be arranged to be responsive to the trigger signal to issue the synchronization request, so as to ensure that at least one synchronization packet is captured.

In one arrangement, the trigger signal can indicate to the trace handling circuit that it should stop capturing trace data immediately. The trace handling circuit thus captures a buffer-sized history of trace data running up to the point at which the trigger signal was received. When the requesting circuitry is responsive to the trigger signal to issue the synchronization request, at least one synchronization point will be present at the end of the captured trace data.

Alternatively, the at least one trace handling circuit could be responsive to the trigger signal to stop capturing trace data at the end of a predetermined interval after receipt of the trigger signal. In this way, the trace handling circuit can capture a predetermined amount of trace data starting from the point at which the trigger signal was received. When the requesting circuitry is responsive to the trigger signal to issue the synchronization request, this ensures that at least one synchronization marker will be present.

In one example, the end of the predetermined interval occurs when a trace buffer becomes full. This ensures that a buffer sized amount of trace history is captured, including at least one synchronization point.

At least one trace data source may be arranged to receive a plurality of synchronization requests for requesting initiation of the synchronization marker generator. If all of the incoming requests are serviced by the trace data source, then it is possible that multiple synchronization markers may be inserted close to one another in the trace data stream. Depending on the relative frequencies of the synchronization requests and the rate at which trace data is currently being generated, this might cause overloading of the trace generator and cause trace data to be lost. It may also mean that downstream trace buffers are not used efficiently as they would contain more synchronization packets than are necessary. For this reason, at least one trace data source may comprise arbitration logic for arbitrating between the plurality of synchronization requests and for selecting one of the plurality of synchronization requests to be serviced. The controller of the trace data source is responsive to selection of the synchronization request to be serviced to initiate the synchronization marker generator. It is recognized that once one synchronization request has been serviced and a synchronization marker has been inserted into the trace data stream, then it is not necessary to service other synchronization requests occurring in close proximity in time. The synchronization marker already inserted into the trace data stream will be sufficient to satisfy those other requests. Arbitrating between synchronization requests helps to reduce the processing load of the trace generator and ensure that downstream trace buffers are utilized more efficiently so as to store fewer synchronization packets and therefore more trace data. When arbitrating between the plurality of synchronization requests, the arbitration logic can thus be configured to discard at least one of the plurality of synchronization requests.

The plurality of synchronization requests received by the at least one trace data source could come from a variety of sources. For example, requests could be issued from within the trace data source itself, such as in response to a counter counting a predetermined amount of time or generated trace data. Alternatively, the synchronization request could also be issued by one or more trace handling circuits. It is possible that the same trace handling circuit or a trace data source could issue several different types of synchronization requests.

It is desirable that the arbitration logic is configured to control the controller to initiate the synchronization marker generator at least as frequently as the most frequently occurring of the plurality of synchronization requests. This helps to ensure that synchronization markers are inserted sufficiently often to satisfy all incoming synchronization requests.

One way in which the arbitration logic can select which synchronization request to be serviced is by maintaining a plurality of flags corresponding to the plurality of synchronization requests. Each flag may be selectively set to one of a first state and a second state. When one of the plurality of synchronization requests is received then the arbitration logic may be configured to:

(i) if one of the flags corresponding to the received synchronization request is already set to the first state, then select the received synchronization request as the synchronization request to be serviced, and set all of the plurality of flags to the second state; and (ii) set the flag corresponding to the received synchronization request to the first state.

This algorithm ensures that if requests of different types occur closely one after the other then only one will be serviced. However, if two requests of the same type are received consecutively then both will be serviced. This ensures that the frequency at which requests are serviced will be at least as frequent as the most frequent input request. In embodiments described below, the first state is a state in which a flag is set, and the second state is a state in which a flag is cleared. However, it will be appreciated that alternatively the flag could be cleared when in the first state and set when in the second state.

The arbitration logic may be configured to set all of the plurality of flags when the arbitration logic is initialized. This means that the first time a synchronization request is received it will be serviced and so a synchronization marker will be generated and inserted by the synchronization marker generator.

When a particular data source is targeted by multiple synchronization requests, another mechanism for preventing too many synchronization requests being serviced by the data source is to provide the data processing apparatus with request combining circuitry for receiving a plurality of synchronization request signals and generating an output request signal. The controller of the trace data source may be responsive to the output request signal generated by the request combining circuitry, to initiate the synchronization marker generator. Thus, the combining circuitry can map a plurality of incoming synchronization request signals coming from various parts of the data processing apparatus and map this to a generated output request signal, which is used to control the operation of the trace data source. The mapping performed by the combining circuitry can be arranged to ensure that the output request signal triggers synchronization less often than would be the case if each of the incoming synchronization request signals was serviced individually. The request combining circuitry could be implemented in various locations in the data processing apparatus, such as within at least one trace data source or downstream from the trace data source.

The request combining circuitry may be arranged to receive synchronization requests from the trace data source or from one or more trace handling circuits.

In one technique for reducing the amount of times at which synchronization occurs for a particular trace data source, each of the incoming plurality of synchronization signals requests initiation of the synchronization marker generator within a respective synchronization window. The synchronization window represents an interval during which a synchronization event would be useful to the device that is requesting synchronization. Each of the synchronization requesting devices can open or close its respective synchronization window by asserting the synchronization request signal at the beginning of the synchronization window and deasserting the synchronization request signal at the end of the synchronization window. The request combining circuitry is responsive to assertion of any of the synchronization request signals to assert the output request signal if it is not already asserted, and is responsive to deassertion of any of the synchronization request signals to deassert the output request signal if it is already asserted. The controller of the trace data source is responsive to deassertion of the output request signal to initiate the synchronization marker generator. Since the output request signal is deasserted if any of the synchronization request signals are deasserted (i.e. the device that requested synchronization is signalling that imminently synchronization will no longer be useful), and the controller is responsive to deassertion of the output request signal to initiate synchronization, this means that synchronization does not occur immediately when it is requested, but is delayed until it can no longer be delayed further. This means that it is possible that by the time any particular synchronization request signal is deasserted to indicate that synchronization will no longer be useful, synchronization may already have occurred in response to a different synchronization request signal. Defining a synchronization window for controlling synchronization rather than triggering synchronization in response to a request at a given instant helps to reduce the number of times that a synchronization marker is inserted into the trace stream.

The synchronization window may be of a predetermined duration or a predetermined amount of generated trace data. The size of the synchronization window may be dependent upon the capacity of a trace buffer (on-chip or off-chip) for capturing trace data.

Viewed from another aspect, the present invention provides a data processing apparatus comprising:
(a) at least two trace data sources operating to generate respective streams of trace data, said trace data sources each comprising:
 (i) a trace data generator responsive to activity in monitored circuitry to generate trace data representing said activity;
 (ii) a synchronization marker generator coupled to said trace data generator, said synchronization marker generator operating to generate a synchronization marker and insert said synchronization marker into said trace data stream, said synchronization marker identifying a synchronization position in said trace data stream; and
 (iii) a controller coupled to said synchronization marker generator, said controller operating to initiate said synchronization marker generator to generate and insert said synchronization marker into said trace data stream; and
(b) one or more trace handling circuits arranged to handle trace data generated by said at least two trace data sources, said one or more trace handling circuits having requesting circuitry for issuing a global synchronization request to said at least two trace data sources; wherein
for each of said at least two trace data sources, said controller initiates said synchronization marker generator in response to receipt of said global synchronization request.

Viewed from a further aspect, the present invention provides a trace generating method for an apparatus comprising at least two trace data sources for generating trace data and at least one trace handling circuit for handling trace data generated by said at least two trace data sources, comprising:
generating respective streams of trace data using said at least two trace data sources, said streams of trace data representing activity in monitored circuitry;
issuing a global synchronization request from said at least one trace handling circuit to said at least two trace data sources; and
in response to receipt of said global synchronization request, generating a synchronization marker and inserting said synchronization marker into each of said respective streams of trace data, said synchronization marker identifying a synchronization position in said trace data stream.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
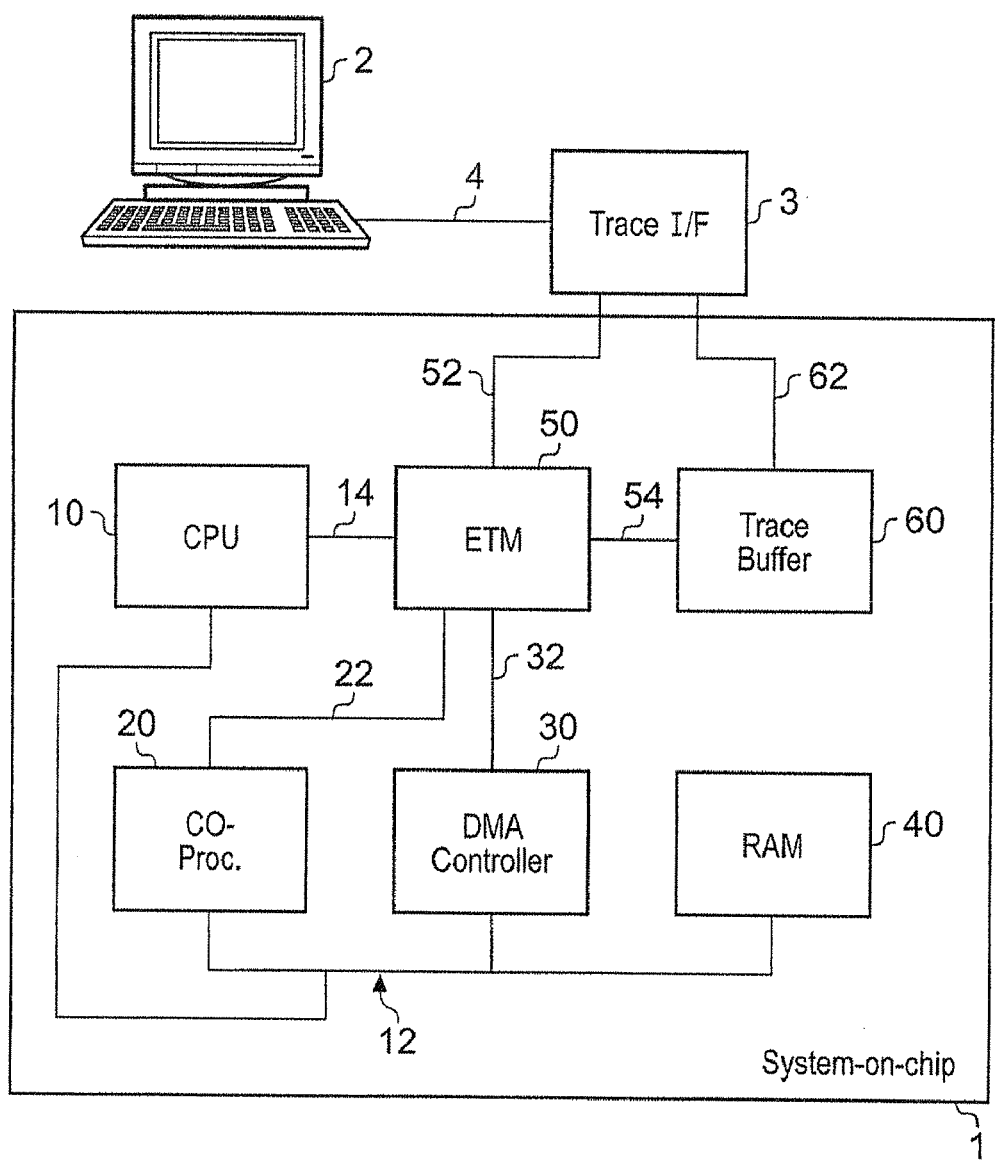
FIG. 1 schematically illustrates an integrated circuit having trace data generation circuitry, and a trace analysis apparatus connected to the integrated circuit.

Referring to FIG. 1, an integrated circuit 1, in this case a system-on-chip circuit, is illustrated. The integrated circuit 1 is coupled to a trace analysis apparatus 2 via a trace interface 3. The trace analysis apparatus may be a general purpose data processing apparatus provided with the necessary software and hardware to connect to the integrated circuit 1 via the trace interface 3, and to perform the required analysis on trace data output from the integrated circuit 1. Trace data generated by the integrated circuit 1 is provided to the trace analysis apparatus 2 via the trace interface 3, and a trace information line 4 connecting the trace analysis apparatus 2 to the trace interface 3.

The integrated circuit 1 comprises a central processing unit 10, a coprocessor 20, a DMA controller 30, and a memory 40, in this case a random access memory (RAM). The central processing unit 10, the coprocessor 20, the DMA controller 30 and the memory 40 are coupled together via a bus 12. The integrated circuit 1 also comprises and embedded trace macrocell (ETM) unit 50 and a trace buffer 60, which together serve to generate and store trace data associated with one or more of the central processing unit 10, the coprocessor 20 and the DMA controller 30. In particular, the embedded trace macrocell unit 50 receives trace related signals from the central processing unit 10 via a signal line 14, from the coprocessor 20 via a signal line 22, and from the DMA controller 30 via a signal line 32. The embedded trace macrocell unit 50 generates trace data from the signals received on the signal lines 14, 22, 32 and outputs the generated trace data to one or both of the trace interface 3, via a signal line 52, and to the trace buffer 60 via a signal line 54. The trace buffer 60 is a circular buffer arranged to store the most recent portion of trace data generated by the embedded trace macrocell unit 50. The trace buffer 60 is operable to output trace data to the trace interface 3 via a signal line 62 when required by the trace analysis apparatus 2.

Figure 2:
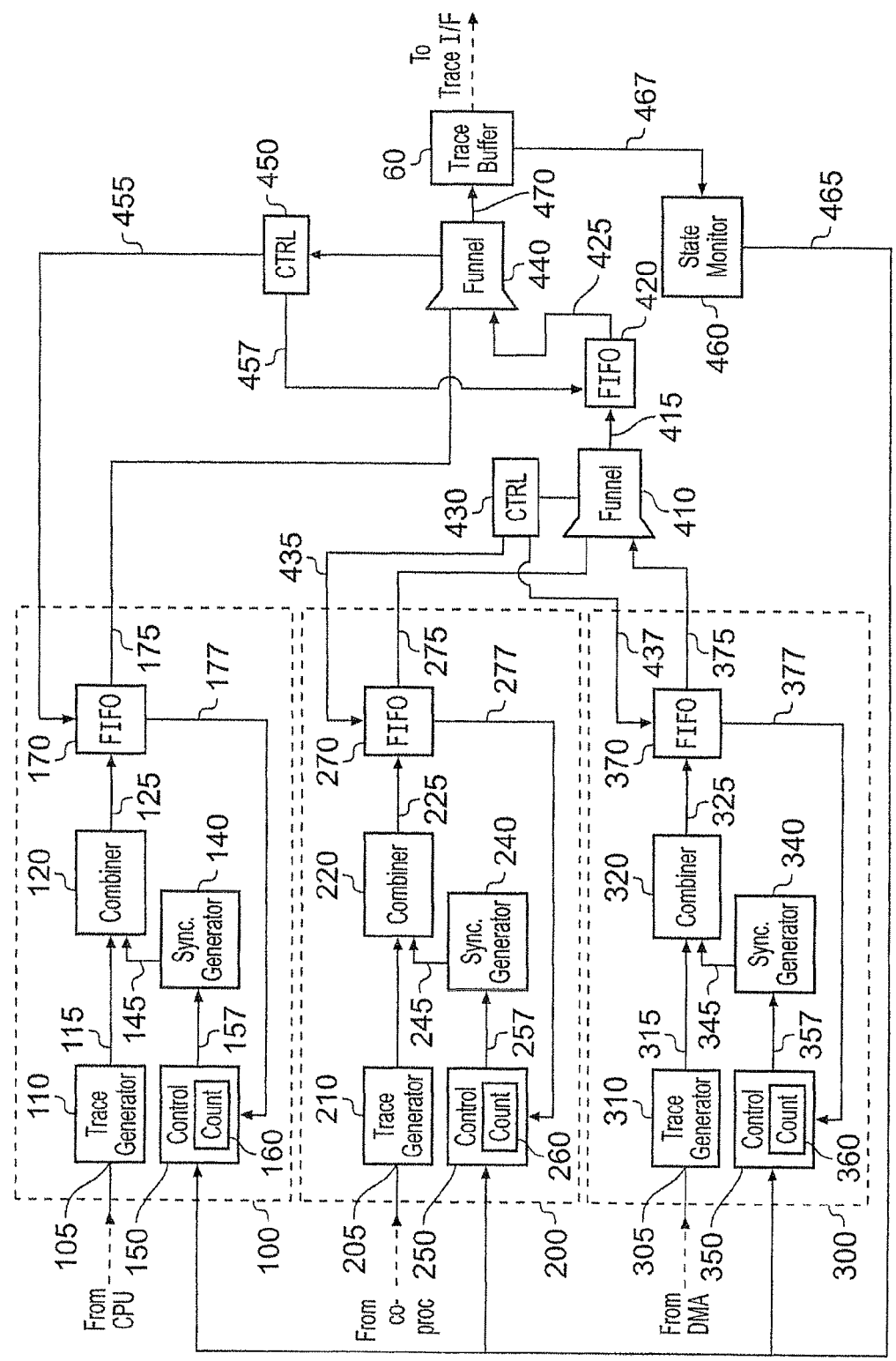
FIG. 2 schematically illustrates an example configuration of trace data generation circuitry having multiple trace data sources.

In FIG. 2, an example configuration of trace data generation circuitry of the embedded trace macrocell unit 50 of FIG. 1 is illustrated. The trace data generation circuitry of FIG. 2 comprises a plurality of trace data sources each generating trace data associated with a particular component of the integrated circuit 1. In particular, a first trace data source 100 generates trace data associated with the central processing unit 10 of FIG. 1, a second trace data source 200 generates trace data associated with the coprocessor 20 of FIG. 1, and a trace data source 300 generates trace data associated with the DMA controller 30 of FIG. 1. Accordingly, it will be appreciated that each of the trace data sources 100, 200, 300 is operable to generate a respective stream of trace data. It will further be appreciated that each of the trace data sources 100, 200, 300 may not generate trace data at all times. This is because when the associated element of the integrated circuit 1 is inactive, no trace data need be generated.

The different trace data sources may also have differing levels of importance with respect to each other. For instance, trace data associated with the central processing unit 10 may be deemed relatively important, whereas trace data associated with the DMA controller 30 may be deemed relatively less important. Accordingly, it may be acceptable to lose trace data from the DMA controller 30, but not from the central processing unit 10. This may result in the trace data associated with the central processing unit 10 being captured very regularly and frequently, while it may be sufficient to capture the trace data associated with the DMA controller 30 less frequently. In the present example trace data is provided to the trace analysis apparatus 2 in a signal stream, either directly, or after being stored into the trace buffer 60, and so it is necessary to multiplex the separate streams of trace data generated by the respective trace data sources 100, 200, 300 into a single output stream. It is further necessary to arbitrate between the trace data sources 100, 200, 300 so that an appropriate mix of trace data from the respective trace data sources 100, 200, 300 can be multiplexed into the single output stream.

The multiplexing and arbitration functions are conducted by funnel circuitry and associated control logic respectively. In particular, in FIG. 2 a funnel 410 is shown to receive trace data outputs from the second trace data source 200 and the third trace data source 300. The funnel 410 has a single output signal line 415 onto which the inputs to the funnel 410 are to be multiplexed. The selection of which trace data output is to be multiplexed onto the output signal line 415 is carried out by control circuitry 430 associated with the funnel 410. An example selection method will be discussed below with reference to FIG. 4. The multiplexed trace data stream output onto the signal line 415 is stored into a first-in-first-out (FIFO) buffer 420 which is operable to subsequently output the data on demand in the order in which it has been stored. The output of the FIFO buffer 420 is applied to a signal line 425 which forms an input of a further funnel 440. The other input of the funnel 440 is the trace data stream output from the first trace data source 100. The second funnel 440 has associated control circuitry 450 which serves to select which of the output of the first trace data source 100 and the trace data stream stored in the FIFO buffer 420 is to be multiplexed onto an output signal line 470 to be stored into the trace buffer 60. In this way, the outputs of the respective trace data sources 100, 200, 300 can be selectively multiplexed into a single trace data stream and stored in the trace buffer 60.

The amount of data being stored into the trace buffer 60 is continuously monitored by a state monitor 460 which is coupled to the trace buffer 60 via a signal line 467. Each time a predetermined amount of data has been stored into the trace buffer, the state monitor 460 generates a global synchronization request and communicates it to each of the trace data sources 100, 200, 300 on a signal line 465. The global synchronization request indicates that synchronization markers should be inserted into the respective trace data streams generated by the trace data sources 100, 200, 300 to enable synchronization of the trace data to take place.

The first trace data source 100 has an input 105 at which signals indicative of the activity of the central processing unit 10 are received. A trace generator 110 is provided which generates trace data in dependence on the signal received at the input 105, and which outputs the generated trace data onto a signal line 115 which is connected to a combiner 120. The first trace data source 100 also comprises a synchronization marker generator 140 which generates synchronization markers under the control of a controller 150 of the first trace data source and outputs the synchronization markers onto a signal line 145 to the combiner 120. At the combiner, the synchronization markers generated by the synchronization generator 140 are combined into the trace data stream generated by the trace generator 110. The combined trace data stream is then output from the combiner 120 to a FIFO buffer 170 via a signal line 125. The FIFO buffer 170 is operable to store up to a predetermined amount of generated trace data, including synchronization markers, and to output it to the funnel 440 on a signal line 175 in response to a control signal from the control circuitry 450 on a signal line 455.

The FIFO buffer 170 is operable to inform the controller 150 of the current free capacity of the FIFO buffer 170 using a signal line 177. The controller 150 is able to use this information to determine when synchronization markers should be inserted into the trace data generated by the trace generator 110. The controller 150 comprises a counter unit 160 which is operable to perform counting functions related to the generation of periodic synchronization requests and to the forcing of synchronization marker insertion when a predetermined amount of time has passed or a predetermined amount of data has been generated since a synchronization request had last occurred.

The second trace data source 200 has an input 205 at which signals indicative of the activity of the coprocessor 20 are received. A trace generator 210 is provided which generates trace data in dependence on the signal received at the input 205, and which outputs the generated trace data onto a signal line 215 which is connected to a combiner 220. The second trace data source 200 also comprises a synchronization marker generator 240 which generates synchronization markers under the control of a controller 250 of the second trace data source and outputs the synchronization markers onto a signal line 245 to the combiner 220. At the combiner, the synchronization markers generated by the synchronization generator 240 are combined into the trace data stream generated by the trace generator 210. The combined trace data stream is then output from the combiner 220 to a FIFO buffer 270 via a signal line 225. The FIFO buffer 270 is operable to store up to a predetermined amount of generated trace data, including synchronization markers, and to output it to the funnel 410 on a signal line 275 in response to a control signal from the control circuitry 430 on a signal line 435.

The FIFO buffer 270 is operable to inform the controller 250 of the current free capacity of the FIFO buffer 270 using a signal line 277. The controller 250 is able to use this information to determine when synchronization markers should be inserted into the trace data generated by the trace generator 210. The controller 250 comprises a counter unit 260 which is operable to perform counting functions related to the generation of periodic synchronization requests and to the forcing of synchronization marker insertion when a predetermined amount of time has passed or a predetermined amount of data has been generated since a synchronization request had last occurred.

The third trace data source 300 has an input 305 at which signals indicative of the activity of the DMA controller 30 are received. A trace generator 310 is provided which generates trace data in dependence on the signal received at the input 305, and which outputs the generated trace data onto a signal line 315 which is connected to a combiner 320. The third trace data source 300 also comprises a synchronization marker generator 340 which generates synchronization markers under the control of a controller 350 of the third trace data source and outputs the synchronization markers onto a signal line 345 to the combiner 320. At the combiner, the synchronization markers generated by the synchronization generator 340 are combined into the trace data stream generated by the trace generator 310. The combined trace data stream is then output from the combiner 320 to a FIFO buffer 370 via a signal line 325. The FIFO buffer 370 is operable to store up to a predetermined amount of generated trace data, including synchronization markers, and to output it to the funnel 410 on a signal line 375 in response to a control signal from the control circuitry 430 received on a signal line 437.

The FIFO buffer 370 is operable to inform the controller 350 of the current free capacity of the FIFO buffer 370 using a signal line 377. The controller 350 is able to use this information to determine when synchronization markers should be inserted into the trace data generated by the trace generator 310. The controller 350 comprises a counter unit 360 which is operable to perform counting functions related to the generation of periodic synchronization requests and to the forcing of synchronization marker insertion when a predetermined amount of time has passed or a predetermined amount of data has been generated since a synchronization request had last occurred.

In some cases, several aspects of synchronization need to be considered, including alignment synchronization to obtain packet boundary alignment, instruction synchronization to obtain an instruction address, data synchronization to obtain a data address, and timestamp synchronization to identify a particular point in time. In this case, for each of the trace sources 100, 200, 300, when a periodic synchronization request is invoked by the respective counter 160, 260, 360, the respective controller 150, 250, 350 will perform each type of synchronization, possibly in a predefined order). Synchronization might be delayed if the state of the internal buffer of the trace source indicates that there is insufficient space in the source's internal buffer.

These synchronization markers can take up to tens or hundreds of times the average data generated in a single processor cycle in total, so synchronizing all forms might cause an overflow if a the trace data source has a small internal FIFO. This has previously required that additional space be allocated in the FIFO to allow for synchronization. The synchronization points may preferably be provided in the above order, since this may be the most efficient order (in terms of discarded data) for some types of trace protocol. Each type of synchronization may be arranged to occur only if there is more than a predefined (hard-wired or configurable) amount of space in the FIFO. For example, if 30 bytes of space are available, alignment synchronization might occur. Once the amount of space in the FIFO has again dropped below the predefined level, the next form of synchronization might occur. This procedure would continue until all forms of synchronization have occurred. The predefined level for each type of synchronization may be different, and this may help to improve the likelihood that the synchronization sequence will complete properly even in a heavily loaded system. In one alternative implementation, only one of the synchronization events might be provided in the FIFO or be generated at any one time. This would avoid the need to monitor the capacity of the FIFO and would be suitable if the FIFO was relatively small, or the rate at which trace packets are generated was low.

The present technique seeks to provide a reasonable slack in the FIFO at all times, to thereby avoid overflow even if a large trace event occurs. It may also provide that if multiple trace sources are competing for bandwidth on a trace bus then the source will not synchronize until some of its trace data has been extracted onto the bus. This makes use of the fact that it is not important exactly when a synchronization packet is inserted into the FIFO, but it is preferable for them to be inserted close together, and more preferably in a specific order. Some protocols may require additional synchronization at well specified time in the trace stream. If these events occur whilst a periodic synchronization is being delayed due to the FIFO state, the pending periodic synchronization packet can be replaced by the specific synchronization packet. This might cause an overflow, but the situation is no worse than it would be without using the present synchronization technique.

Figure 3:
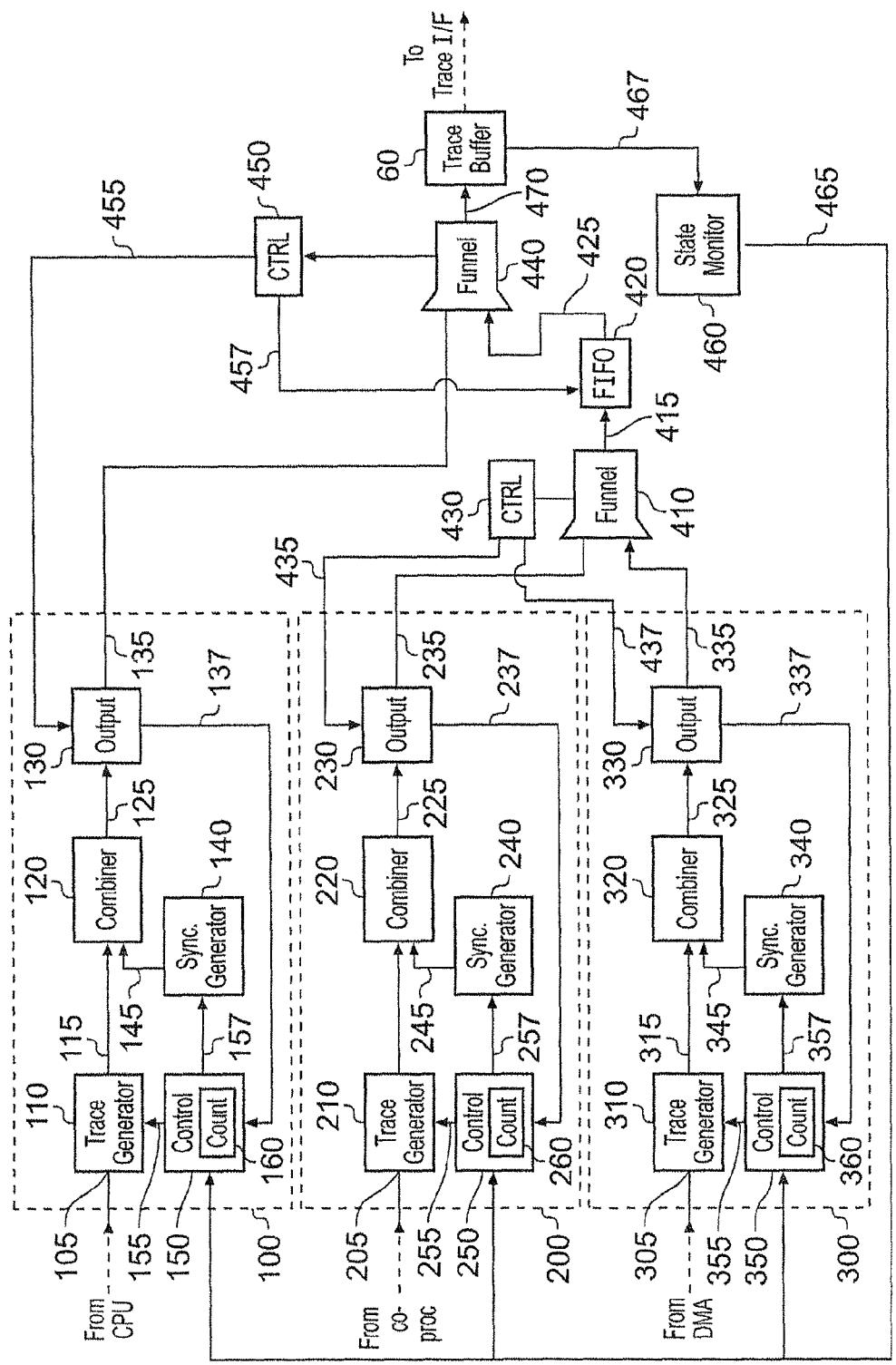
FIG. 3 schematically illustrates another example configuration of trace data generation circuitry having multiple trace data sources.

In FIG. 3, an alternative example configuration of trace data generation circuitry of the embedded trace macrocell unit 50 of FIG. 1 is illustrated. As with FIG. 2, the trace data generation circuitry of FIG. 3 comprises a plurality of trace data sources each generating trace data associated with a particular component of the integrated circuit 1. To the extent that the features of FIG. 3 are identical to those of FIG. 2, these features will not be described again. The structural difference between FIG. 2 and FIG. 3 is the replacement of the FIFO buffers in the trace data sources of FIG. 2 with simple output units in the trace data sources of FIG. 3.

In particular, in the first trace data source 100, an output unit 130 is provided which receives combined trace data and synchronization markers from the combiner 120. The output unit 130 is responsive to a control signal received from the control circuitry 450 on a signal line 455 to output trace data to the funnel 440. If data is not to be output, then it may either be discarded, or the generation of further trace data by the trace generator 110 may be stalled. The output unit 130 is operable, using a signal line 137, to inform the controller 150 that data has been output from the output unit 130 to the funnel 440. In this way, the controller 150 is able to monitor the acceptance of trace data by the downstream circuitry to determine when to insert synchronization markers into the trace data generated by the trace generator 110.

In the second trace data source 200, an output unit 230 is provided which receives combined trace data and synchronization markers from the combiner 220. The output unit 230 is responsive to a control signal received from the control circuitry 430 on a signal line 435 to output trace data to the funnel 410. If data is not to be output, then it may either be discarded, or the generation of further trace data by the trace generator 210 may be stalled. The output unit 230 is operable, using a signal line 237, to inform the controller 250 that data has been output from the output unit 230 to the funnel 410. In this way, the controller 250 is able to monitor the acceptance of trace data by the downstream circuitry to determine when to insert synchronization markers into the trace data generated by the trace generator 210.

In the third trace data source 300, an output unit 330 is provided which receives combined trace data and synchronization markers from the combiner 320. The output unit 330 is responsive to a control signal received from the control circuitry 430 on a signal line 437 to output trace data to the funnel 410. If data is not to be output, then it may either be discarded, or the generation of further trace data by the trace generator 310 may be stalled. The output unit 330 is operable, using a signal line 337, to inform the controller 350 that data has been output from the output unit 330 to the funnel 410. In this way, the controller 350 is able to monitor the acceptance of trace data by the downstream circuitry to determine when to insert synchronization markers into the trace data generated by the trace generator 310.

Figure 4:
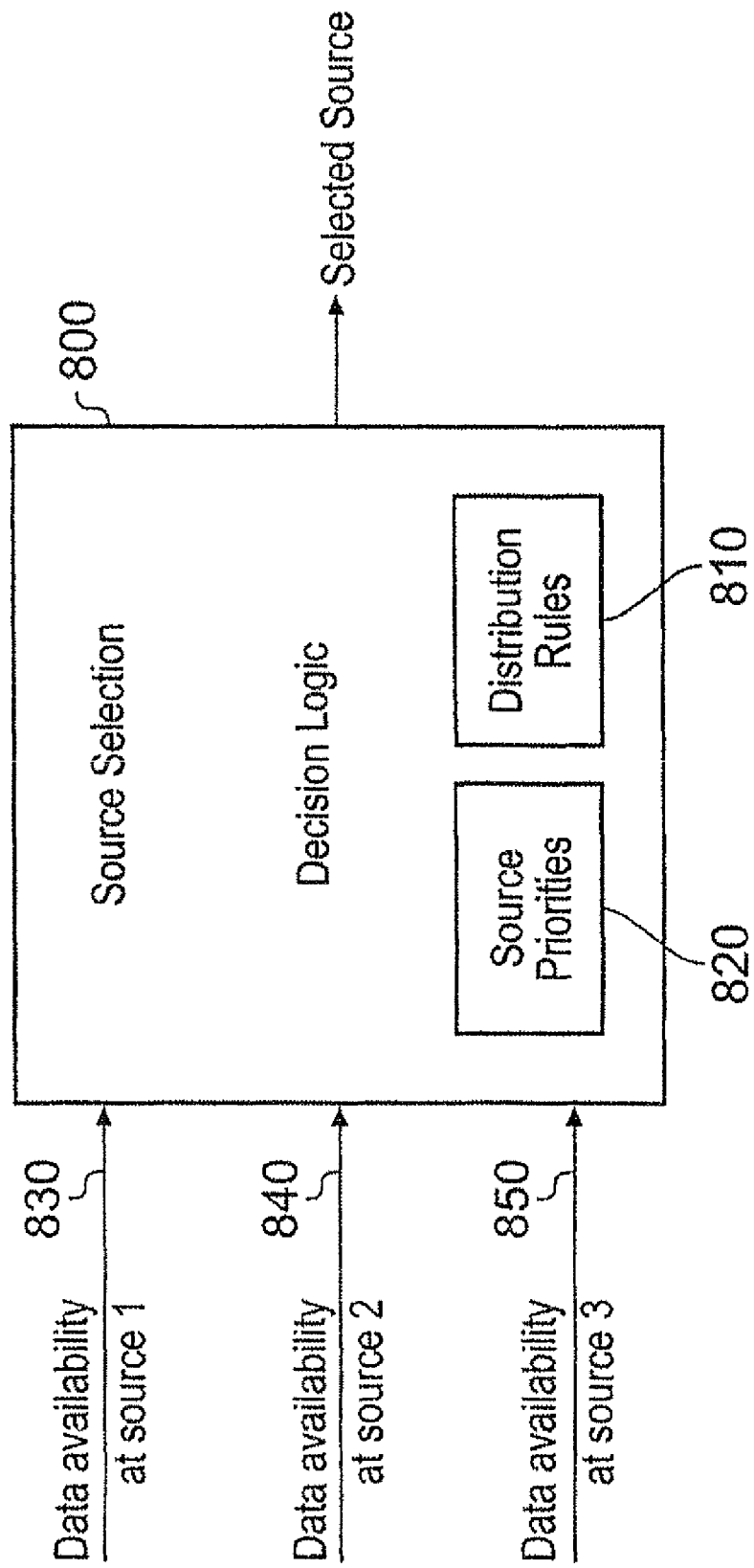
FIG. 4 schematically illustrates source selection decision logic which selects one of a plurality of outputs from trace data sources to be output for analysis

Referring to FIG. 4, source selection decision logic 800 for selecting between the respective trace data sources 100, 200, 300 is schematically illustrated. The selection of trace data sources for output is determined in dependence on the availability of data at each of the respective data sources, priorities 820 associated with the respective trace data sources, and distribution rules 810 for specifying the arbitration between the trace data sources such that the trace data output from each of the trace data sources 100, 200, 300 is appropriately represented in the output trace data stream. In particular, the source selection decision logic 800 receives a first input 830 representing the data availability at the first trace data source, a second input 840 representing the data availability at the second trace data source, and a third input 850 representing the data availability at the third trace data source 300. In the present case the source priorities 820 and the distribution rules 810 are determined in advance, and are hard wired into the integrated circuit. However, in an alternative embodiment one or both of the source priorities 820 and the distribution rules 810 may be user programmable. The source selection decision logic defines the selection of inputs for the first funnel 410 and the second funnel 440 made by the control circuitry 430 and the control circuitry 450 of FIGS. 2 and 3, and defines the signals applied to the signal lines 455, 457, 435, 437 which indicate to the trace data output blocks or buffers that trace data has been accepted.

Figure 5:
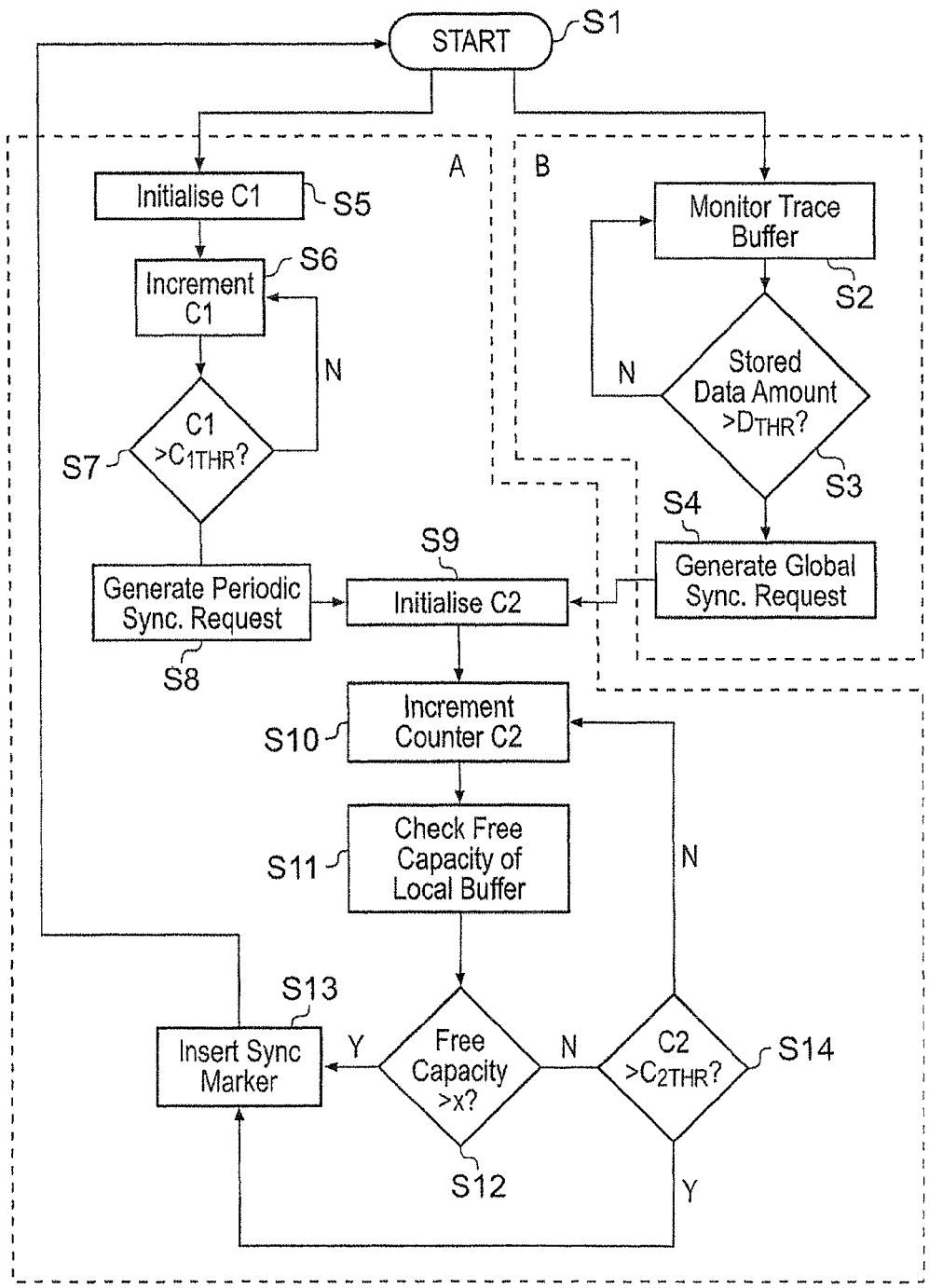
FIG. 5 is a schematic flow diagram illustrating a process for generating and servicing synchronization requests in accordance with the example configuration of trace data generation circuitry illustrated in FIG. 2.

Referring to FIG. 5, a schematic flow diagram is illustrated which represents a method of generating and servicing synchronization requests in accordance with the example configuration of trace data generation circuitry illustrated in FIG. 2. The method starts at a step S1 and commences in parallel with two processes. A first process, corresponding to the operation of a trace data source, is represented by the steps shown within the bounded area A of FIG. 5. A second process, corresponding to the generation of global synchronization requests by the state monitor of FIG. 2, is represented by the steps shown within the bounded area B of FIG. 5.

Referring first to the steps relating to the generation of the global synchronization request, at a step S2 the trace buffer is monitored to determine an amount of data which has been stored into the trace buffer. At a step S3, it is determined whether the amount of data stored into the trace buffer has exceeded a threshold amount $D_{THR}$. If the amount of data stored into the trace buffer has not exceeded this threshold amount then processing returns to the step S2 where the trace buffer will be monitored for further data input. If it is determined at the step S3 that the amount of data stored into the trace buffer has exceeded the threshold amount $D_{THR}$, then processing moves on to a step S4 where a global synchronization request is generated and communicated to each of the data sources. In this way, a global synchronization request is generated whenever a certain amount of data has been stored into the trace buffer, which should result in synchronization markers being provided at intervals throughout the trace data stored into the trace buffer. In parallel with the process of the steps S2 to S4, a process for generating periodic synchronization requests using the counter unit of a trace data source is executed. In particular, at a step S5 a first counter, C1 is initialized in the counter unit, and then at a step S6 is incremented. At a step S7, it is determined whether the value of C1 exceeds a predetermined threshold $C_{1THR}$. If the threshold value $C_{1THR}$ has not been exceeded, then processing returns to the step S6 whereby the counter is incremented again. In this way, the steps S6 and S7 will repeat until the value of C1 exceeds the threshold $C_{1THR}$, or until the counter is reinitialized. When at the step S7 it is determined that the value of C1 has exceeded the threshold $C_{1THR}$, then at a step S8 a periodic synchronization request is generated. While in the present case the counter C1 is incremented as a function of time, the counter C1 could instead be incremented each time a certain amount of data has been generated by the trace data source.

At a step S9, in response to the generation of either a global synchronization request at the step S4, or a periodic synchronization request at the step S8, a second counter, C2 is initialized by the counter unit of the trace data source. Then, at a step S10, C2 is incremented. At a step S11, the free capacity of a local buffer associated with the trace data source is checked, and is compared, at a step S12 with a threshold amount x. If at the step S12, it is determined that the free capacity of the local buffer is greater than the threshold amount x, then processing moves to a step S13 where a synchronization marker is inserted into the trace data stream output by the trace data source. If on the other hand it is determined at the step S12 that the free capacity of the local buffer is less than the threshold capacity x, then processing proceeds to a step S14 where the value of the counter C2 is compared with a threshold amount $C_{2THR}$. If the value of C2 is greater than the threshold amounts $C_{2THR}$, then processing will progress to the step S13 where a synchronization marker will be inserted into the trace data steam output by the trace data source. Alternatively, if it is determined at the step S14 that the value of the counter C2 is less than the threshold amount $C_{2THR}$, then processing will return to the step S10 where C2 will be incremented. In this way a synchronization marker will be inserted into the trace data stream either when the free capacity local buffer is greater than a certain amount or when a predetermined time has lapsed as measured by the counter C2. This prevents synchronization requests being unsatisfied for too long, which would result in trace data which could not be synchronized, and would therefore be unusable.

Figure 6:
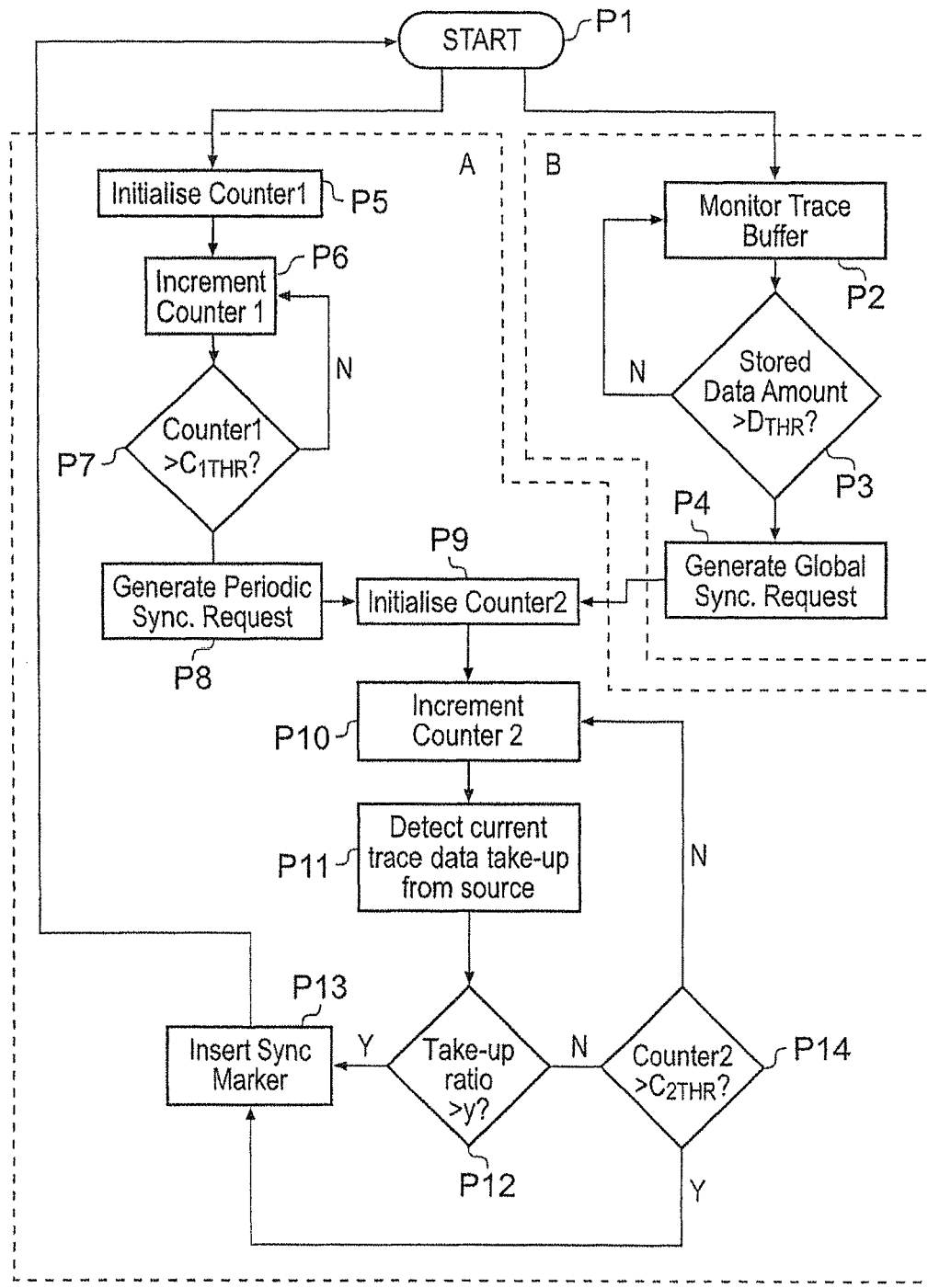
FIG. 6 is a schematic flow diagram illustrating a process for generating and servicing synchronization requests in accordance with the example configuration of trace data generation circuitry illustrated in FIG. 3.

In FIG. 6, a process for generating and servicing synchronization requests similar to that illustrated in FIG. 5 is presented. As with FIG. 5, the method commences in parallel with two processes. A first process, corresponding to the operation of a trace data source, is represented by the steps shown within the bounded area A of FIG. 6. A second process, corresponding to the generation of global synchronization requests by the state monitor of FIG. 3, is represented by the steps shown within the bounded area B of FIG. 6. Steps P1 to P10 of FIG. 6 correspond exactly to the steps S1 to S10 of FIG. 5, and therefore will not be described further.

Following the step P10 of FIG. 6, where a counter C2 (corresponding to the counter C2 of FIG. 5) is incremented, the current take up by the down stream circuitry of the trace data stream output from the trace data source is detected. The take up of data from the trace data source by the down stream circuitry may be determined as a ratio of the amount of trace data accepted from the trace data source by the downstream circuitry to the amount of trace data actually generated by the trace data source. Alternatively, other measures of take up could be used. It is then determined at a step P12 whether the take up ratio is greater than a threshold value y. If the take up ratio is greater than the threshold value y, then at a step P13 a synchronization marker is inserted into the trace data stream output by the trace data source. Alternatively, if it is determined at the step P12 that the take up ratio is not greater than the threshold value y then processing moves on to a step P14 where the value of the counter C2 is compared with the threshold $C_{2THR}$. If it is determined that the step P14 that the value of the counter C2 is greater than the threshold amount, $C_{2THR}$, then processing returns to the step P10 where the value of the counter C2 is again incremented. In this way a synchronization marker will be inserted into the trace data stream either when the take up ratio is greater than a certain amount or when a predetermined time has lapsed as measured by the counter C2. As with FIG. 5, this prevents synchronization requests being unsatisfied for too long, which would result in trace data which could not be synchronized, and would therefore be unusable.

Figure 7:
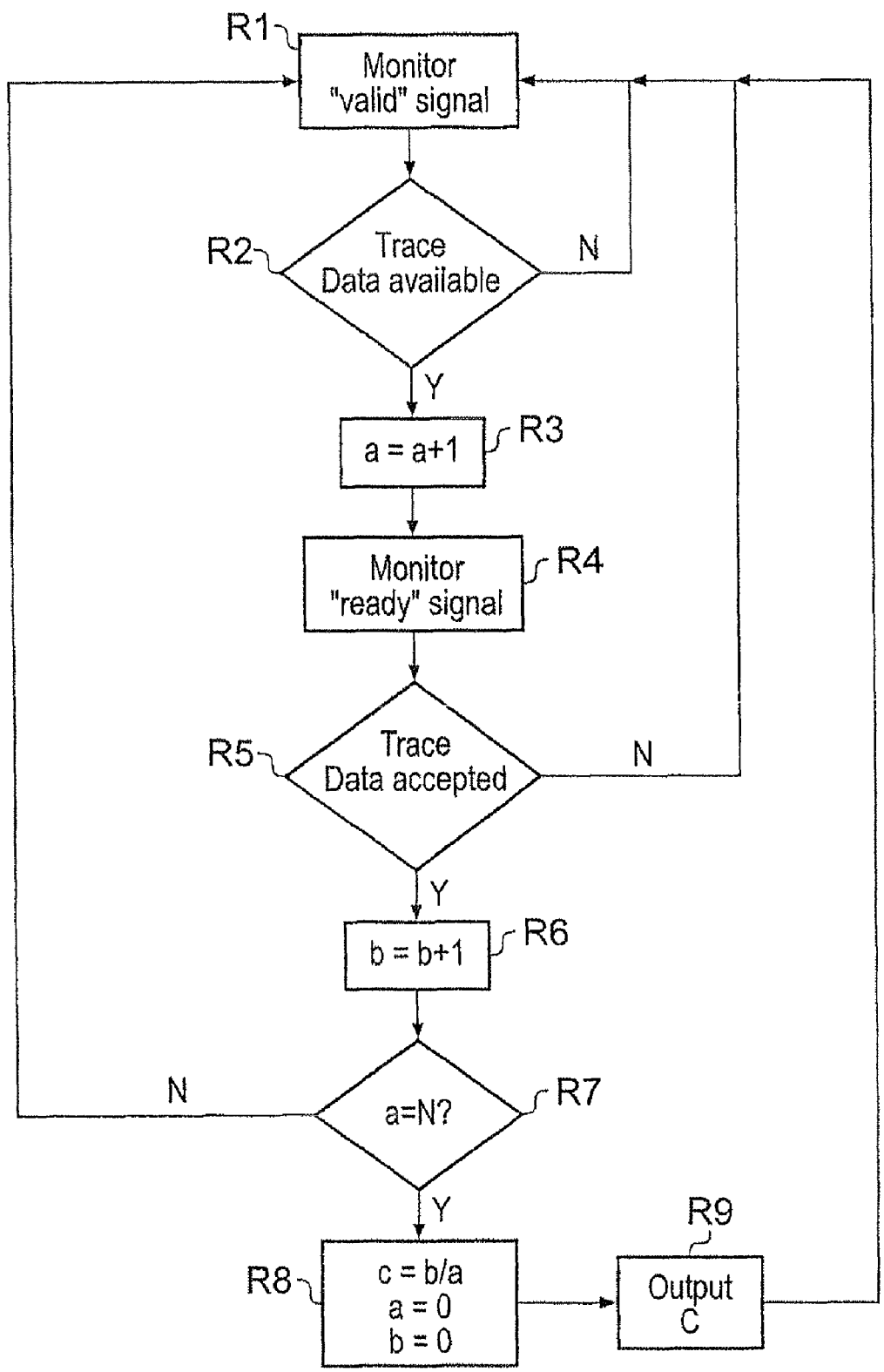
FIG. 7 is a schematic flow diagram illustrating a process for detecting the activity of downstream circuitry.

In FIG. 7, an example process for determining the take up ratio used in FIG. 6 to identify when synchronization markers should be inserted into the trace data stream is illustrated. The example process is illustrated with reference to the first trace data source 100 illustrated in FIG. 3, however it will be appreciated that a similar process may be applied in the case of the second and third trace data sources 200, 300. At the start of the process shown in FIG. 7, variables a and b are set to zero. At a step R1 the controller 150 of the trace data source 100 monitors the signal line 137 to detect whether a trace data signal is available for output from the trace data source. If at a step R2, it is determined that trace data has been generated, and is therefore available at the trace data source, then at a step R3 a variable a is incremented. If at the step R2 it is determined that no trace data is available for output then the process of R1 and R2 will continue until trace data has been generated by the trace data source and is ready for output at the output unit 130.

Once the variable a has been incremented at the step R3, then at a step R4 the controller 150 monitors the signal line 137 to detect whether the trace data is being output from the trace data source and is therefore being accepted by the down stream circuitry. If at a step R5, it is determined that trace data has been accepted from the output unit 130, then at a step R6 a variable b is incremented. Alternatively, if that the step R5 it is determined that trace data has not been accepted from the trace data source, then processing will return to the step R1, where the controller 150 will resume monitoring the output unit 130 for trace data being ready for output.

When the variable b has been incremented at the step R6, then processing moves onto a step R7 where the variable a is compared with a value N. If the variable a is equal to the value N, then the process will move onto a step R8 where a variable c is calculated to be the ratio of the variable b to the variable a. The variables a and b are also initialized to zero at this stage. Then at a step R9, the variable c is output to represent the current take up ratio of the down stream circuitry. Processing then returns from the step R9 to the step R1. If, at the step R7 it is determined that the value of variable a is less than value N, then processing returns to the step R1. As such, the take up ratio is averaged over a period of recent trace data. Between successive instances of step R9, the most recent value of the take up ratio is continuously output for use in the step P11 of FIG. 6.

As an alternative, the take-up ratio for down steam circuitry may be recalculated at every N cycles of the process of FIG. 7. In this case, then instead of incrementing the variable a in step R3 following step R2 as shown in FIG. 7, a should be incremented between steps R1 and R2.

The example arrangements shown up to now have shown a trace buffer for handling trace streams. However, it is also possible that multiple circuits for handling generated trace streams are provided. For example, there may be more than one trace buffer, or one or more ports for communicating trace data to off-chip devices.

Figure 8:
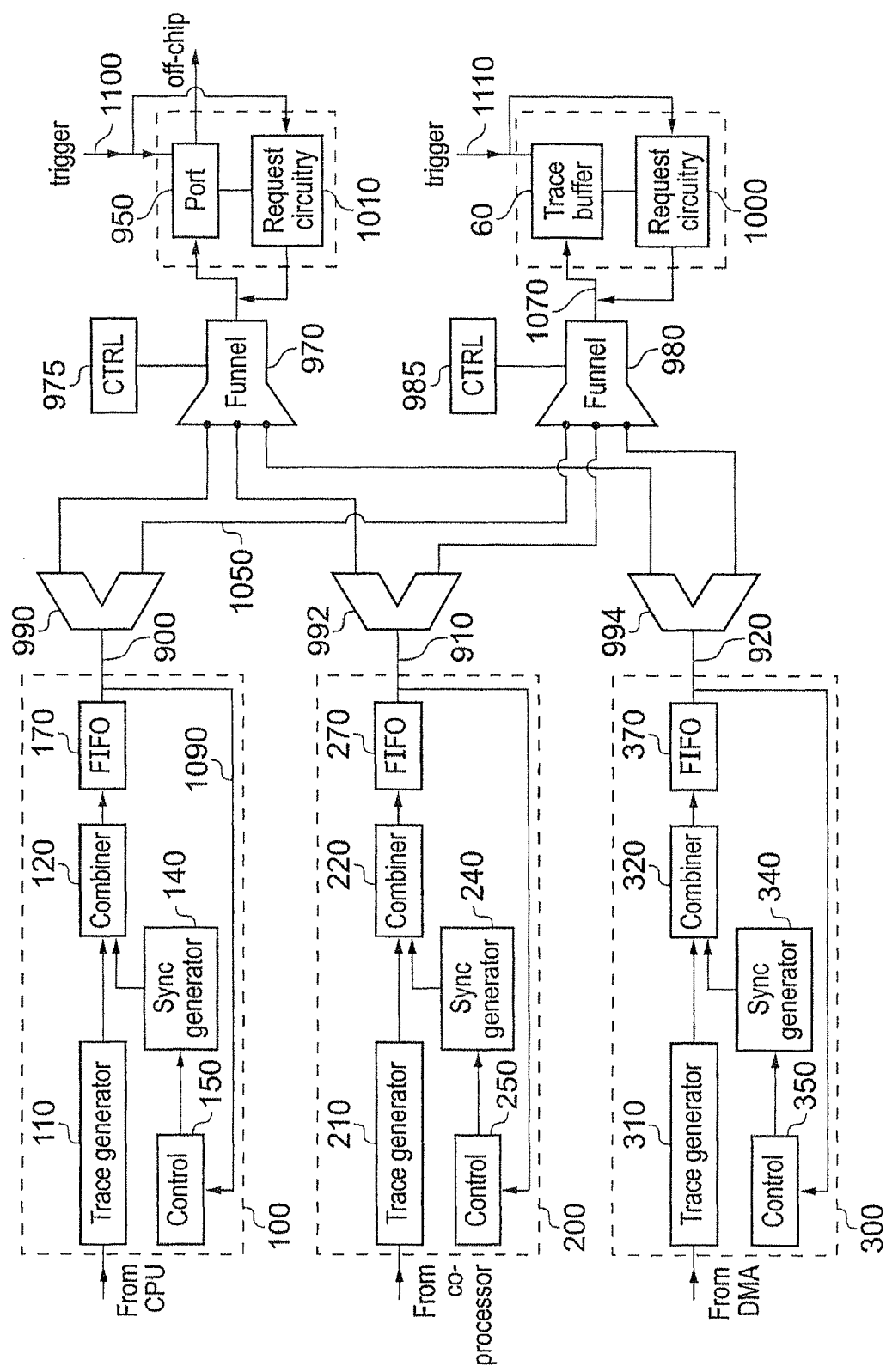
FIG. 8 schematically illustrates an example configuration having multiple trace data sources and multiple trace data handling circuits.

FIG. 8 schematically illustrates an example configuration of trace data generation circuitry having multiple trace data sources and multiple trace data handling circuits. The arrangement shown in FIG. 8 is similar to that shown in FIG. 2 or 3, and so elements that are shown in both Figures are labeled using the same reference numerals.

The trace data generation circuitry of FIG. 8 again comprises three trace data sources 100, 200, 300. Each data source generates a trace data stream and outputs it over paths 900, 910, 920. In this example, two circuits for handling trace data are provided. A trace buffer 60 is similar to the buffer described previously. In addition, a trace output port 950 is provided to enable trace data to be communicated to an off-chip capture device. The trace handling circuits 60, 950 can also be referred to as trace sinks.

The trace data generation circuitry of FIG. 8 is configurable such that the trace buffer 60 and the output port 950 may capture trace data streams generated by any subset of one or more trace data sources 100, 200, 300. The selection of which trace data streams are captured by which of the trace handling circuits (i.e. the trace buffer 60 and output port 950) is carried out by funnel logic 970, 980 under control of control logic 975, 985. The trace data sources 100, 200, 300 output respective trace data streams over lines 900, 910, 920. Splitting/combining circuitry 990, 992, 994 is provided to receive the generated trace data streams and direct these to the respective funnel logic 970, 980. For each trace handling circuit 60, 950, the associated funnel logic 970, 980 receives the trace data streams and selects one or more of those trace data streams to provide to the trace buffer 60 or the output port 950. This selection of trace data streams is carried out under control of the control logic 975, 985. The configuration of the trace data paths between respective trace data sources and trace data handling circuits may be performed at run-time by the control logic 975, 985.

If each of the trace data sources 100, 200, 300 controls the timings at which synchronization of its own trace data stream is initiated, the trace handling circuits 60, 950 may not be used in the most efficient way. This is because each of the trace data sources is not aware of the amount of trace data being generated by the other trace data sources. If synchronization markers are generated by the synchronization generator 140, 240, 340 at a time when the trace buffer 60 or the output port 950 is being heavily used, then it is possible that there could be an overflow.

To avoid this problem, the trace buffer 60 and the output port 950 are provided with request circuitry 1000, 1010 for requesting synchronization by at least one trace data source. The request circuitry 1000, 1010 monitors the current usage of the trace buffer 60 or output port 950 and hence can request synchronization at a time when there is a lower probability of an overflow occurring.

In some situations it may be particularly desirable for the request circuitry 1000, 1010 to issue a global synchronization request for requesting that multiple trace data sources 100, 200, 300 initiate synchronization at the same time. The control circuitry 150, 250, 350 of the respective trace data sources 100, 200, 300 is responsive to the issued global synchronization request to control the synchronization generator 140, 240, 340, to generate and insert a synchronization marker into the trace stream. Synchronizing multiple trace data sources simultaneously is useful because it avoids problems that may occur if trace data sources are synchronized individually. For example, different trace data sources 100, 200, 300 may generate trace data at different rates. If one source (100, say) generates trace data at a higher rate than another trace data source (200, say), then the trace buffer 60 or output port 950 will at any one time be handling more trace data from source 100 than from source 200. If source 200 has not inserted synchronization markers sufficiently often, then this could mean that the trace data captured by the trace buffer 60 or the output port 950 does not contain a synchronization marker for the second trace source 200, and so the trace data stream from this source could not be decompressed. This problem is avoided by issuing a global synchronization request from the request circuitry 1000, 1010 of the trace data handling circuit 60, 950, The request circuitry can monitor the capacity of the buffer 60 or the bandwidth of the output port 950 and request global synchronization sufficiently often to ensure that there will be at least one synchronization marker from each source present in the captured trace data at any one time. Global trace synchronization removes the need to know in advance the approximate trace data generation rates of all the trace sources.

Figure 8A:
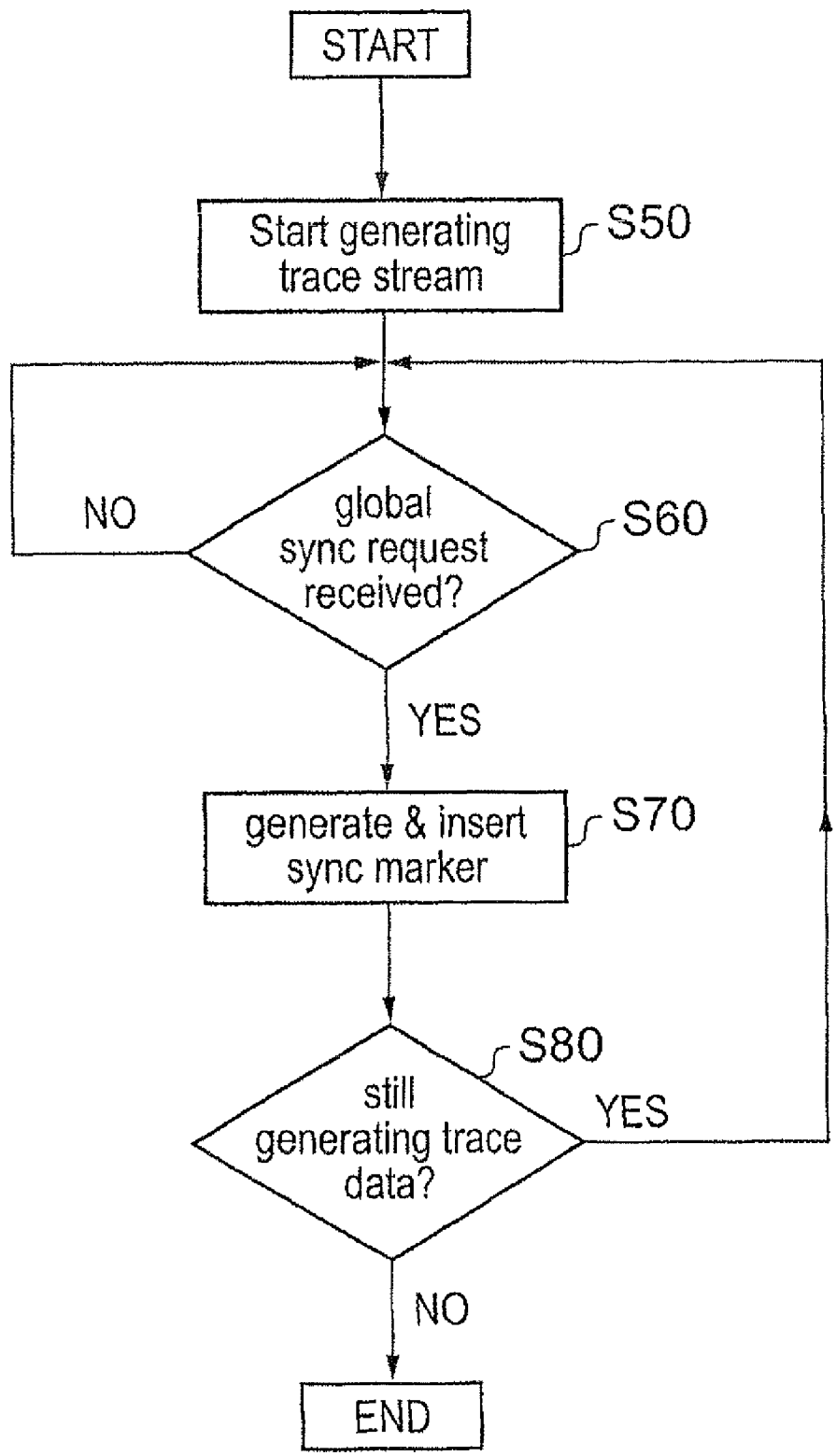
FIG. 8A illustrates a method for implementing global trace synchronization.

FIG. 8A illustrates a trace generation method using global trace synchronization. As an example, FIG. 8A will be explained below with reference to steps performed by the trace data source 100. However, it should be noted that, in parallel to the operation of trace data source 100, the same steps would also be carried out by the other trace data sources 200, 300.

At step S50, the trace data source 100 begins generating a stream of trace data. At step S60 the control circuitry 150 determines whether or not a global synchronization request has been received from one of the trace handling circuits (buffer 60 or port 950). If a global synchronization request is received, then at step S70 the control circuitry 150 initiates synchronization and controls the synchronization marker generator 140 to generate a synchronization marker and insert the marker into the trace stream. Next, at step S80, it is determined whether trace data is still being generated by the trace data source 100. If trace data is still being generated, then flow returns to S70 where the control circuitry 150 again waits for a global synchronization request to be received. If no more trace data is being generated, then the processing ends.

The method of FIG. 8A is carried out simultaneously by each trace data source 100, 200, 300 that is currently generating trace data. Since each of the trace data sources initiates synchronization at the same time in response to the global synchronization request, then this method ensures that at least one synchronization marker will be present in each trace stream being captured by the trace handling circuits.

Although it is possible to transmit the global synchronization request from the request circuitry 1000, 1010 to the respective control units 150, 250, 350, of the data sources using a path such as path 465 in FIG. 2, it is particularly useful to transmit the synchronization request using the trace data paths that were used to transmit the trace data from the trace data source to the trace handling circuit, 60, 950. In the arrangement shown in FIG. 8, for example, if the trace data stream generated by the trace data source 100 is being captured by the trace buffer 60, then the trace data would be sent via the splitting/combining circuitry 990 and the funnel logic 980 using paths 900, 1050, 1070. Since the control circuitry 985 associated with the funnel logic has already configured these paths to convey the trace data, the request circuitry 1000 can also issue the synchronization request using the same paths. Thus, the synchronization request would be conveyed from the request circuitry 1000 via path 1070, funnel logic 980, path 1050, splitting/combining circuitry 990, path 900, and path 1090 to the control circuitry 150 of the data source 100. Similarly, synchronization requests can be conveyed from either of the trace buffer 60 and the output port 950 to any of the trace data sources 100, 200, 300, along the appropriate paths. Since the already configured hardware is re-used by the requesting circuitry to transmit its synchronization requests, the requesting mechanism requires little additional hardware to be implemented. The trace data paths could form part of a trace bus infrastructure.

Figure 9:
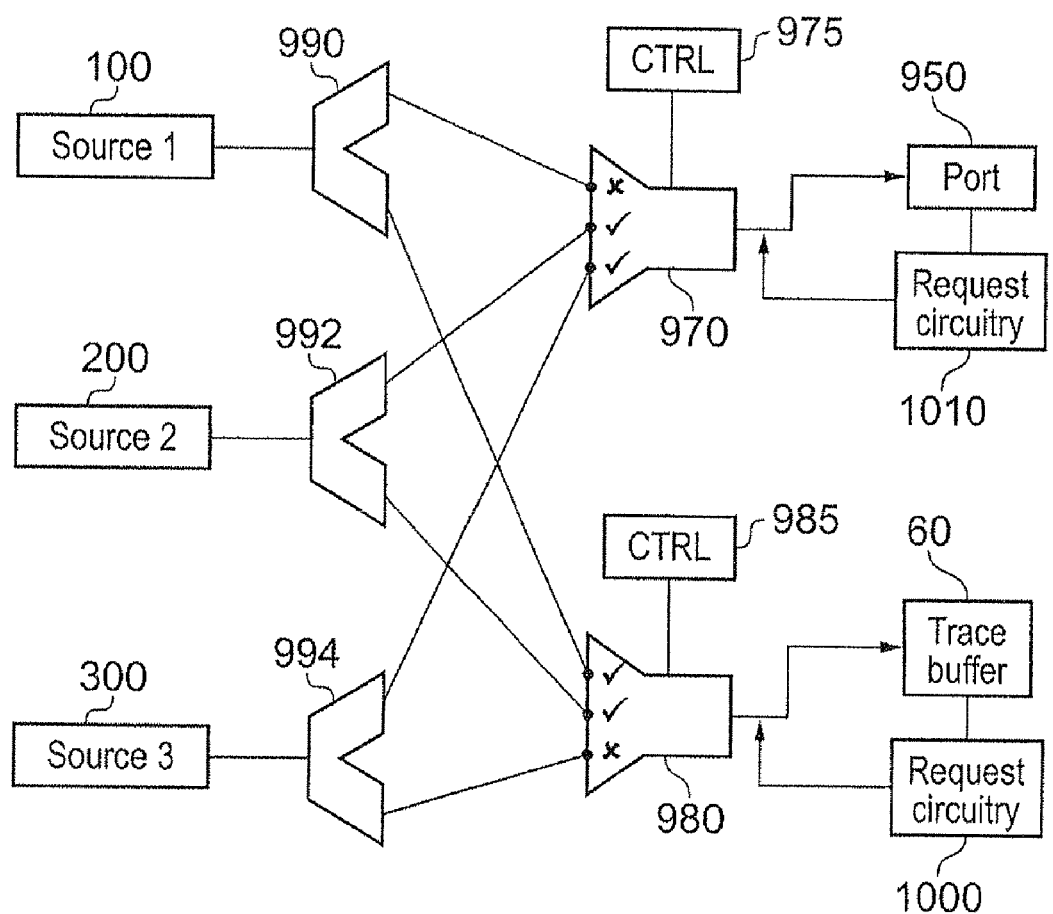
FIG. 9 schematically illustrates trace data paths connecting trace data sources and trace handling circuits.

Note that the trace data stream generated by the trace data sources 100, 200, 300 may not necessarily be being captured by each of the trace handling circuits 60, 950 at any one time. FIG. 9 shows a simplified schematic illustration showing the data paths connecting the trace data sources and trace handling circuits of FIG. 8. In this example, control circuit 975 is controlling the funnel logic 970 associated with the trace ports 950 so that only the streams generated by trace data sources 200 and 300 are being captured by the port 950. The trace data stream generated by trace data source 100 is not currently being captured. Similarly, control circuitry 985 is controlling the funnel logic 980 such that the trace buffer 60 captures the trace data streams generated by sources 100 and 200, but not trace data source 300. It is in such a situation where only a selected subset of the available trace data paths are being used that it is particularly advantageous for the requesting circuitry associated with the respective trace handling circuits 60, 950, to issue global synchronization requests using the trace data paths along which the trace data is conveyed. This is because the paths are configured only for those pairs of trace data sources and trace handling circuits for which the trace handling circuit is currently capturing the trace stream generated by the trace data source, and so this means that when these paths are re-used the synchronization requests will be directed only to those sources for which trace data is currently being captured by the appropriate trace handling circuit. For example, in FIG. 9 the path linking source 100 and the trace port 950 has not be configured since the funnel logic 970 is not passing the trace data stream generated by the source 100 to the port 950. In this case, the requesting circuitry 1010 will issue a synchronization request that will not be received by source 100. This ensures that the respective trace data sources 100, 200, 300 receive only the synchronization requests which have been issued by requesting circuitry associated with a trace handling circuit which is capturing the trace data stream from that trace data source. Since synchronization requests issued from one of the trace handling circuits are directed only to sources which supply that trace handling circuit, this avoids too many expensive synchronization markers being inserted into the trace streams of other trace data sources.

As described above, the requesting circuitry 1000, 1010, can be responsive to the current state of the buffer 60 or port 950 to trigger synchronization at an appropriate time. However, it is also possible that the request circuitry could be responsive to external signals to trigger synchronization. Referring once more to FIG. 8, on some occasions it may be desirable for the trace buffer 60 or the trace port 950 to stop capturing the trace data, so that a specific set of trace data can be collected and analyzed. On such occasions, a trigger signal 1100, 1110 can be issued to the port 950 or trace buffer 60 to indicate that it should stop capturing trace data. The trace buffer 60 or port 950 could respond to the trigger signal 1100, 1110 in different ways. For example, the buffer 60 or port 950 could respond to the trigger signal 1100, 1110 by stopping the capture of trace data immediately. This would be useful if it is desired to capture a set of trace data representing the operations of the monitored circuitry immediately preceding some event of interest represented by the trigger point. Alternatively, the buffer 60 or port 950 could respond to the trigger signal 1100, 1110 by continuing to capture trace data for a predetermined interval after receiving the trigger signal. For example, the interval could last until the trace buffer 60 becomes full. In this case, the captured trace data would indicate a sequence of events immediately following the events that cause the trigger signal to be issued. Similarly, the port 950 could continue to capture data for a period corresponding to an amount of data that needs to be captured in order for an off-chip capture device to become full.

In order for the captured trace data to be decompressed, at least one synchronization marker will need to be present within the captured trace data. One way of ensuring that such a synchronization marker will always be present within the captured data is to arrange for the request circuitry 1000, 1010 to be responsive to the trigger signal to issue a synchronization request. The requesting circuitry could be arranged to only issue synchronization requests when such a trigger is received, or could be configured to inhibit future synchronization requests once the trigger has occurred. This can help to increase the amount of trace data which will be captured in the buffer by avoiding the generation of unnecessary synchronization packets.

As shown in FIG. 8, there are multiple sources of synchronization requests within the trace data generation circuitry. For example, the request circuitry 1000, 1010 can generate requests in response to the current usage of the buffer 60 or the port 950. Also, the request circuitry 1000, 1010 can, as described above, generate requests in response to receipt of a trigger signal 1100, 1110. Alternatively, it is possible for synchronization requests to be generated from within the trace data sources 100, 200, 300. As shown in FIG. 2, the control unit 150, 250, 350 may comprise a counter 160, 260, 360 for counting up to a predetermined amount of data or a predetermined time. Although the counter 160 is not illustrated in the arrangement shown in FIG. 8, it will be appreciated that it could also be present. Thus, a single trace data source 100, 200, 300 could receive multiple synchronization requests from various different devices (including both synchronization requests directed to particular trace data sources and global synchronization requests directed to multiple sources).

If all synchronization requests received by a particular trace data source were serviced and synchronization initiated in response to each request, then this could result in many synchronization markers being inserted into the trace data stream close to one another. Inserting so many synchronization markers may be unnecessary since the same marker can satisfy any of the requests as one marker will usually be enough to enable decompression of the trace data. Thus, if two requests occur close to one another then it is possible to discard one of the requests.

Figure 10:
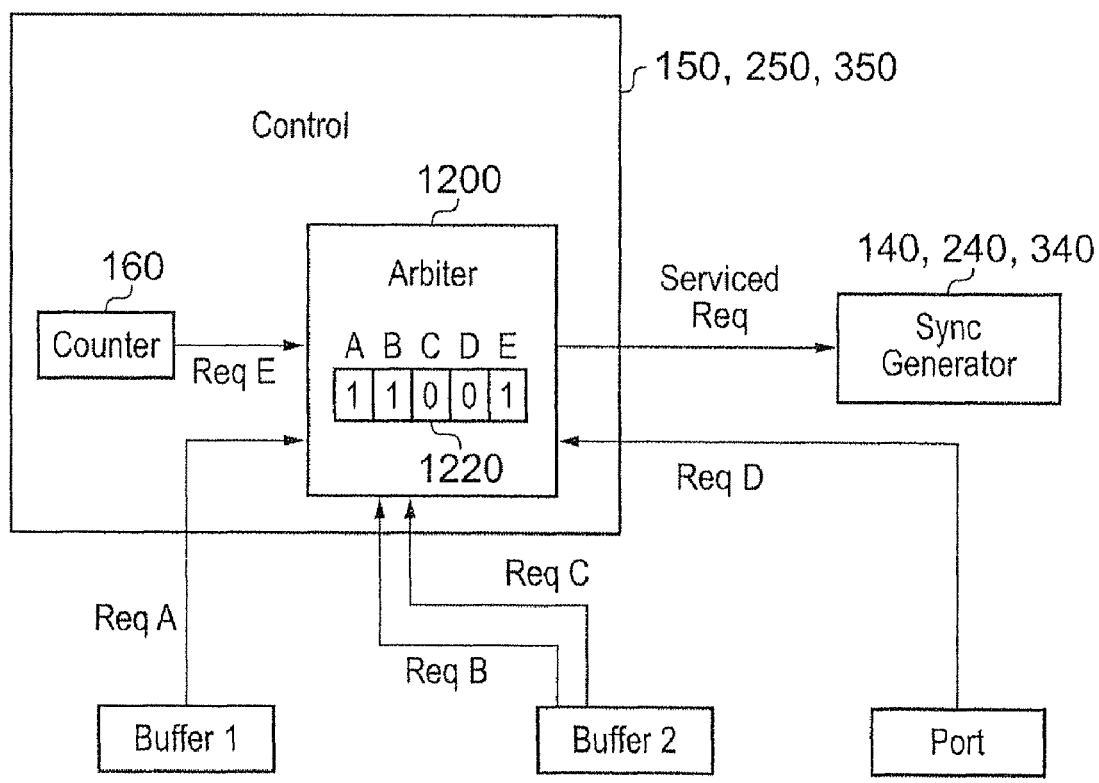
FIG. 10 schematically illustrates an example configuration of control circuitry having arbitration logic for arbitrating between different synchronization requests.

FIG. 10 schematically illustrates an example configuration of the control unit 150, 250, 350 within the trace data sources. The control unit can arbitrate between incoming synchronization requests and select a request to be serviced by the synchronization generator. Since, as shown in FIGS. 2, 3 and 8, the synchronization requests could come from a variety of sources and be distributed to the control unit 150, 250, 350 by different means, FIG. 10 does not illustrate the detailed paths by which the requests arrive at the control unit, 150, 250, 350. It will be appreciated that any of the arrangements shown in FIGS. 2, 3 and 8 could be used to distribute the synchronization requests.

The control unit 150, 250, 350 receives requests from various trace handling circuits (such as trace buffers or trace ports), as well as from within the trace data source (for example a request that is triggered based on the counter 160 as described above with reference to FIG. 2). Note that a single source of synchronization requests could generate more than one type of synchronization request. For example, Buffer 2 in FIG. 10 could generate one type of request in dependence upon the current status of the buffer, and another type of request in dependence upon a trigger signal. The different synchronization requests are received by the control unit 150, 250, 350 and are provided to an arbiter 1200. The arbiter 1200 arbitrates between the incoming synchronization requests and selects one of the synchronization requests as a synchronization request to be serviced. The serviced synchronization request is issued to the synchronization generator 140, 240, 340 which responds by generating and inserting a synchronization marker into the trace data stream. Since each incoming synchronization request is requesting the same thing (the insertion of a synchronization marker), then if a plurality of synchronization requests occur simultaneously, it should be sufficient for only one of those requests to be serviced. However, if requests occur at different times, then the arbiter 1200 must select synchronization requests to be serviced with a frequency that ensures that enough synchronization markers are added to the trace data stream.

For this reason, the arbiter 1200 maintains a series of flags 1220. When a synchronization request is received, it is serviced only if the corresponding flag has been set. If the corresponding flag has not already been set, then the flag is set but the request is not serviced.

Figure 11:
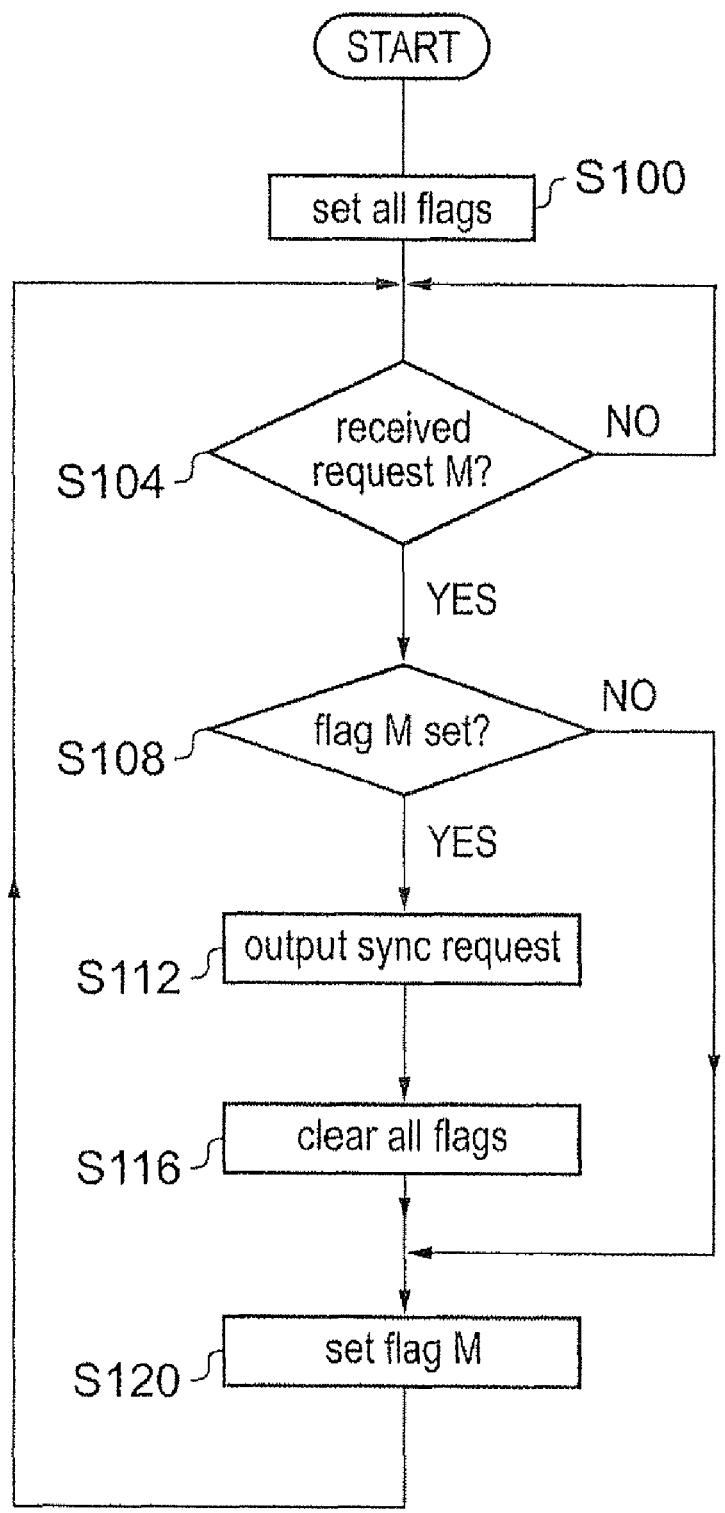
FIG. 11 illustrates an example algorithm for arbitrating between synchronization requests.

FIG. 11 shows an example algorithm that the arbiter 1200 can use to ensure that synchronization does not occur too often but nevertheless ensures that enough markers are inserted. Firstly, when the arbiter is initialized, all flags 1220 are set at step S100. This ensures that the first synchronization request to be received will be serviced. At step S104, the arbiter 1200 determines whether a request of type M has been received. If no request has been received then flow returns to step S104. Once a request has been received, then flow progresses to step S108, where the arbiter determines whether the flag corresponding to request type M has been set. If flag M has been set, then the arbiter 1200 selects the received synchronization request type M as the synchronization request to be serviced and outputs the synchronization request to the synchronization generator 140, 240, 340. Having outputted the synchronization request, the arbiter 1200 then clears all of the flags 1220 corresponding to all of the types of synchronization request. The flow next proceeds to step S120, where the flag corresponding to the received request type M is set. This step is performed both when all the flags have just been cleared at step S116 in the event that the synchronization request M has been serviced, and also when at step S108 the flag for request type M was not set. Step S120 therefore ensures that the next time that a request of type M is received it will be serviced. Having set flag M, flow then returns to step S104 where the arbiter 1200 again waits for a received request.

By clearing all flags when a synchronization request is serviced, the arbiter 1200 ensures that if another request occurs shortly thereafter, then that request will not be serviced as a synchronization marker has already been inserted into the trace stream. This helps to reduce the amount of synchronization data generated. However, if two requests of the same type occur one after another then both of these requests will be serviced since the flag for that type of request has been set up at step S120 shortly after the first of those two requests was serviced at step S112. This ensures that the frequency with which requests are serviced is at least as frequent as the most frequently occurring of the different types of synchronization request that are received by the control unit. By initiating synchronization at the frequency of the most frequent synchronization request, the demands of all other types of synchronization request should be satisfied as well.

The algorithm shown in FIG. 11 can also be represented by the following pseudocode:

```
set all flags;
on (req[M])
    if (flag[M] is set) {
        output request;
        clear all flags; }
    set flag [M];
```

If multiple requests arrive simultaneously, then all request flags could be set, or a priority scheme could be applied to set at least one of the flags.

Figure 12:
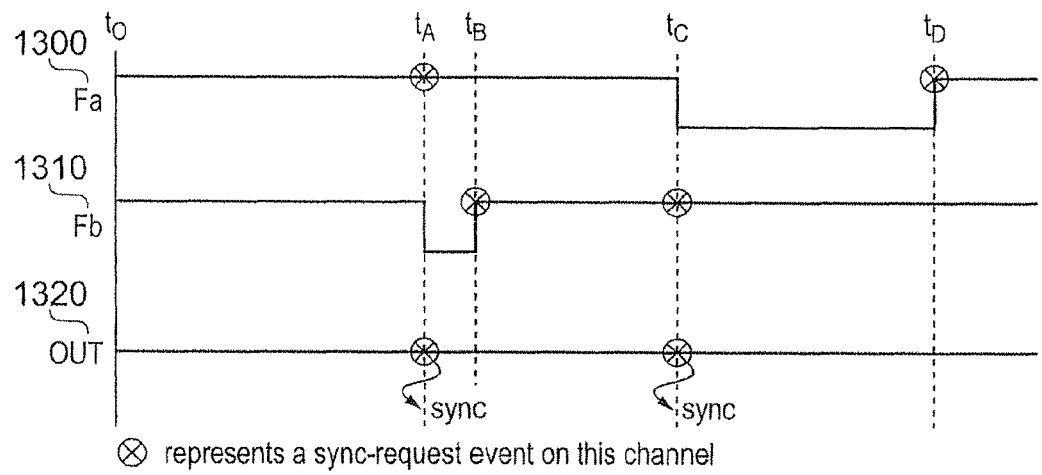
FIG. 12 shows a timing diagram showing an example of the arbitration processing.

FIG. 12 shows an example of the operation of the arbitration technique used in FIGS. 10 and 11. In this example, two different types of synchronization request are shown, although it will be appreciated that the technique can be extended to arbitrate between more synchronization requests. In FIG. 12, 1300 shows an example of the changes in value of the flag corresponding to a request type A. Similarly, 1310 shows the changes in the value of the flag corresponding to request type B. For each of these, the times at which a synchronization request is received are indicated using a cross in a circle. 1320 shows the timings at which a synchronization request is output to the synchronization generator in order to trigger synchronization.

When the arbiter 1200 is initialized, both flags Fa and Fb are set, as illustrated at time $t_0$ of FIG. 12. Then, at time $t_A$, a synchronization request of type A is received. Since flag Fa is set at this time, a synchronization request is output to the synchronization generator, as shown in 1320. All flags are then cleared, but the flag Fa corresponding to request A is set again (following steps S116 and S120 of FIG. 11). Thus, after time $t_A$ the flag Fb is not set, but flag Fa is set. When at time $t_B$ a synchronization request of type B is received, this request is not serviced, because the flag for that request is not already set. Instead, the arbiter 1200 sets the flag for request type B. This means that later, when at time $t_C$ another request of type B is received, then this request is serviced and so the synchronization generator initiates synchronization. Next, all flags are cleared and the flag Fb corresponding to request type B is set. Finally, at time $t_D$, another request of type A is received, but this request is not serviced because the flag Fa is not set at this time.

FIG. 12 shows that instead of servicing all four of the synchronization requests that were received, the arbitration logic only services two of these requests. Thus, the arbitration logic helps to reduce the amount of synchronization data which is generated. The synchronization markers which have been generated can be sufficient to enable decompression of the trace data.

However, some sources of synchronization request may require synchronization to occur within a particular synchronization window. For example, in FIG. 12 the device that issued the synchronization request type A at time $t_D$ may not be able to use the synchronization packets that were generated at time $t_C$. This may be because, say, the buffer associated with this type of request is too small and so the synchronization packet inserted at time $t_C$ could already have been overwritten in the buffer by time $t_D$. In such a situation, some synchronization data may be lost by not servicing the synchronization requests arriving at time $t_D$ and so some data may not be decompressible. If, for example, the device associated with request type B has stopped capturing trace data and so is not issuing any further requests, then it may be some time before another request of type A occurs which can trigger synchronization.

Figure 13:
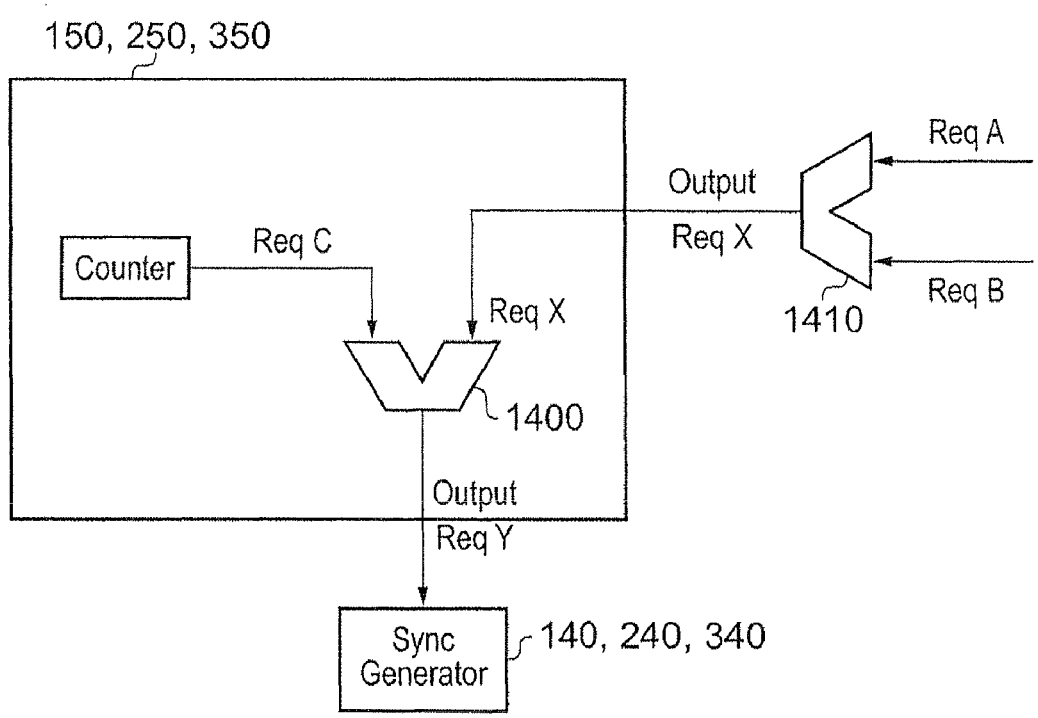
FIG. 13 illustrates the use of combining circuitry for converting multiple synchronization requests into a single output request.

FIG. 13 illustrates another example configuration in which these difficulties may be overcome. Again, the detailed paths linking the devices generating the synchronization requests to the control logic 150, 250, 350 have not been illustrated for clarity. It will be appreciated that the configuration shown in any of FIGS. 2, 3 and 8 could be used. In the arrangement of FIG. 13, multiple synchronization requests can be combined to form a single output request using combining circuitry 1400, 1410. The combining circuitry could be implemented in various locations within the apparatus. For example, request combining circuitry 1400 could be implemented within the control unit 150, 250, 350 of a trace data source so as to combine requests arriving from outside the trace data source with those generated from within the trace data source. Alternatively, combining circuitry 1410 could be implemented outside of the data source at positions where multiple requests are received and a single request output to the data source. This could, for example, form part of the trace splitting/combining circuitry 990, 992, 994 shown in FIG. 8 or 9. Wherever multiple requests need to be mapped to a single unified request, this combining circuitry 1400, 1410 could be used.

To indicate that generation of a synchronization marker would be useful within a synchronization window, a device generating a synchronization request asserts the corresponding synchronization request signal at the beginning of the window and deasserts the synchronization request signal at the end of the window. Thus, when the signal is asserted the synchronization window is open and this indicates to the combiner 1400, 1410 that the device requesting synchronization would find synchronization useful during that period. When the device requesting synchronization deasserts the synchronization request signal, this indicates to the combiner 1400, 1410 that it is no longer possible to wait any longer for the request to be serviced.

The window could last for a predetermined length of time, or a predetermined number of clock cycles, or a predetermined amount of generated trace data. The duration of the synchronization window will depend upon the device generating the request. For example if the request is issued by a trace buffer, then it may depend upon the number of records which may be stored in the buffer. For example, if the buffer has space for N records, and requires approximately 10 synchronization markers to be present within the buffer at any one time, then the period at which synchronization is initiated would normally be every N/10 records. In this case, the window would be set to a particular fraction of this period, say N/40 records long.

The combining circuitry 1400, 1410 operates with a simple set of rules:

1. If any synchronization request signal is asserted, and the output request signal is already asserted, the combining circuitry does nothing.
2. If any incoming synchronization request signal is deasserted, and the output request signal is not already asserted, then the combiner 1400 also does nothing.
3. If any request signal is asserted, and the output request signal is not already asserted, then the combining circuitry 1400 asserts the output request signal.
4. If any request signal is deasserted, and the output request signal is already asserted, then the output request signal is deasserted.

It is the deassertion of the output request signal that triggers synchronization by the synchronization generator 140, 240, 340. This means that synchronization occurs as late as possible within the window allowed by the device requesting synchronization.

Figure 14:
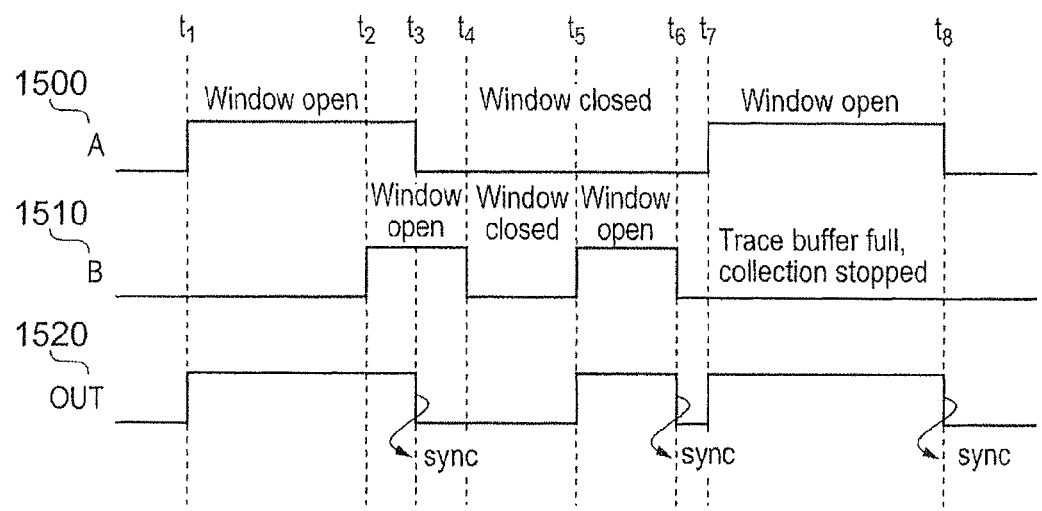
FIG. 14 shows a timing diagram illustrating the use of the combining circuitry.

The operation of this technique is explained further with reference to FIG. 14. In FIGS. 14, 1500 and 1510 represent the synchronization requests received by the combining circuitry 1400, 1410 shown in FIGS. 13, and 1520 represents the output request signal generated by the combining circuitry 1400, 1410. In FIG. 14, assertion of a signal is represented by a transition of the signal from low to high and deassertion by a transition from high to low. However, it will be appreciated that assertion could instead correspond to the high to low transition and deassertion correspond to the low to high transition.

As shown in FIG. 14, at various times the devices requesting synchronization assert request signals 1500 and 1510 to show that synchronization would be useful to them. At these times, if the output request signal 1520 is not already asserted, then it is asserted by the combining circuitry 1400 (for example at times $t_1$, $t_5$ and $t_7$). Having opened the synchronization window by asserting the relevant synchronization request signal 1500, 1510, the devices requesting synchronization then close the synchronization window when synchronization will no longer be useful. For example, at time $t_3$ synchronization request signal 1500 is deasserted. Since at this time the output request signal 1520 is already asserted, it is then deasserted in accordance with rule 4 above. Deassertion of the output signal 1520 signals to be synchronization generator that it should initiate synchronization, as indicated by the synchronization event shown in line 1520 at time $t_3$.

Since the combining circuitry 1400 waits as late as it possibly can within the synchronization window to service the synchronization request, this means that by the time that the synchronization window for one request ends, synchronization may already have occurred when another request signal is deasserted, and so in this case a single synchronization marker can satisfy multiple requests. For example, in FIG. 14, request signal 1510 is deasserted at time $t_4$. However, by this time the output request signal 1520 has already been deasserted at time $t_3$ and so the combiner does nothing (in accordance with rule 2 above). This is because a synchronization marker was inserted into the trace stream at time $t_3$ (which was within the synchronization window associated with request 1510), and so another synchronization marker would not be necessary. Thus, this technique avoids unnecessarily large numbers of synchronization packets being inserted into the trace data stream, while nevertheless ensuring that each synchronization data request results in a synchronization marker being inserted at some point within the corresponding synchronization window.

Note that the times at which the request signals 1500 and 1510 are deasserted ($t_3$, $t_4$, $t_6$, $t_8$) correspond to the times at which synchronization requests arrive in FIG. 12 ($t_A$, $t_B$, $t_C$, $t_D$). In both techniques, the first two requests can be satisfied by insertion of a single synchronization marker (at time $t_A$ in FIG. 12 or $t_3$ in FIG. 14). Thus, the number of inserted trace packets is reduced. However, in FIG. 14, the synchronization packet at time $t_8$ is not lost (compare this with the unserviced request at time $t_D$). The FIG. 14 technique ensures that each synchronization request is serviced at some point within the synchronization window, but enables multiple synchronization requests to be serviced by insertion into the trace stream of a single synchronization packet. On the other hand, if the precise timing at which synchronization occurs is not so critical then the FIG. 12 arbitration technique might be more useful as it may result in fewer trace synchronization markers being inserted into the trace stream.

FIG. 14 shows that the output signal 1520 has a similar form to the request signals 1500 and 1510. When the output is asserted this means that synchronization would be useful for at least one of the incoming requests. When the output signal 1520 is deasserted this means that at least one of the requests can wait no longer and so synchronization must begin. Since the output signal 1520 has a similar form to the incoming request signals 1500 and 1510, this means that multiple combining circuits 1400 can be used in succession to progressively combine more and more request signals. For example, as shown in FIG. 13, the output X from one request combining circuit 1410 is used as one of the inputs for another combining circuit 1400. Thus, in the FIG. 13 example, the output of combiner 1400 will correspond to a combined synchronization request signal Y that represents whether synchronization would be useful for any of the devices that issue request signals A, B and C. The synchronization generator 140, 240, 340 can be arranged to be responsive to the combined output signal Y.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus having one or more trace data sources, said trace data sources operating to generate respective streams of trace data, at least one of said trace data sources comprising:
    a trace data generator responsive to activity in monitored circuitry to generate trace data representing said activity;
    a synchronization marker generator coupled to said trace data generator, said synchronization marker generator operating to generate a synchronization marker and insert said synchronization marker into said trace data stream, said synchronization marker identifying a synchronization position in said trace data stream; and
    a controller coupled to said synchronization marker generator, said controller operating to initiate said synchronization marker generator to generate and insert said synchronization marker into said trace data stream; wherein said controller controls initiation in dependence on behavior of said data processing apparatus downstream of said trace data generator with respect to trace data flow, said apparatus comprising one or more trace handling circuits arranged to handle trace data generated by said trace data generator of said at least one trace data source; wherein said one or more trace handling circuits each have requesting circuitry for issuing a synchronization request and said controller of said at least one trace data source is responsive to receipt of said synchronization request to initiate said synchronization marker generator, wherein at least one of said one or more trace handling circuits handles trace data from a plurality of said trace data sources;
    said requesting circuitry of said at least one trace handling circuit is arranged to issue a global synchronization request to said plurality of trace data sources; and
    for each of said plurality of trace data sources, said controller initiates said synchronization marker generator in response to receipt of said global synchronization request, wherein said at least one trace handling circuit receives trace data from said plurality of trace data sources via respective trace data paths; and
    said requesting circuitry of said at least one trace handling circuit issues said global synchronization request to said plurality of trace data sources via said trace data paths.

2. The data processing apparatus according to claim 1, comprising control circuitry for selecting said trace data paths from a plurality of available trace data paths.

3. A data processing apparatus comprising:
    (a) at least two trace data sources operating to generate respective streams of trace data, said trace data sources each comprising:
        (i) a trace data generator responsive to activity in monitored circuitry to generate trace data representing said activity;
        (ii) a synchronization marker generator coupled to said trace data generator, said synchronization marker generator operating to generate a synchronization marker and insert said synchronization marker into said trace data stream, said synchronization marker identifying a synchronization position in said trace data stream; and
        (iii) a controller coupled to said synchronization marker generator, said controller operating to initiate said synchronization marker generator to generate and insert said synchronization marker into said trace data stream; and
    (b) one or more trace handling circuits arranged to handle trace data generated by said at least two trace data sources, said one or more trace handling circuits having requesting circuitry for issuing a global synchronization request to said at least two trace data sources; wherein
    for each of said at least two trace data sources, said controller initiates said synchronization marker generator in response to receipt of said global synchronization request.

4. The data processing apparatus according to claim 3, wherein at least one of said one or more trace handling circuits is an on-chip trace buffer.

5. The data processing apparatus according to claim 3, wherein at least one of said one or more trace handling circuits is an output port for transferring trace data to an off-chip capture device.

6. The data processing apparatus according to claim 3, wherein said at least one trace handling circuit is responsive to a trigger signal to stop capturing trace data, and said requesting circuitry is responsive to said trigger signal to issue said synchronization request.

7. The data processing apparatus according to claim 6, wherein said at least one trace handling circuit is responsive to said trigger signal to stop capturing trace data immediately.

8. The data processing apparatus according to claim 6, wherein said at least one trace handling circuit is responsive to said trigger signal to stop capturing trace data at an end of a predetermined interval after receipt of said trigger signal.

9. The data processing apparatus according to claim 8, wherein said end of said predetermined interval is when a trace buffer becomes full.

10. The data processing apparatus according to claim 3, comprising:
   request combining circuitry for receiving a plurality of synchronization request signals and generating an output request signal; and wherein:
   said controller is responsive to said output request signal to initiate said synchronization marker generator.

11. The data processing apparatus according to claim 10, comprising one or more trace handling circuits arranged to handle trace data generated by said at least two trace data sources; and wherein:
   said request combining circuitry is arranged to receive said plurality of synchronization request signals from at least one of said at least one trace data source and said one or more trace handling circuits.

12. A trace generating method for an apparatus comprising at least two trace data sources for generating trace data and at least one trace handling circuit for handling trace data generated by said at least two trace data sources, comprising:
   generating respective streams of trace data using said at least two trace data sources, said streams of trace data representing activity in monitored circuitry;
   issuing a global synchronization request from said at least one trace handling circuit to said at least two trace data sources; and
   in response to receipt of said global synchronization request, generating a synchronization marker and inserting said synchronization marker into each of said respective streams of trace data, said synchronization marker identifying a synchronization position in said trace data stream.

* * * * *